United States Patent
Usui et al.

(10) Patent No.: US 7,275,521 B2
(45) Date of Patent: Oct. 2, 2007

(54) JOINT STRUCTURE OF DIVERGING BRANCH PIPE IN FUEL RAIL FOR INTERNAL COMBUSTION ENGINE, DIVERGING BRANCH PIPE AND MANUFACTURE METHOD OF ITS DIVERGING BRANCH PIPE

(75) Inventors: Masayoshi Usui, Numazu (JP); Kikuo Asada, Mishima (JP); Yasuaki Hashimoto, Izu (JP); Hiroyuki Nishizawa, Numazu (JP); Iichiro Seino, Mishima (JP)

(73) Assignee: Usui Kokusai Sangyo Kaisha Limited (JP)

( * ) Notice: Subject to any disclaimer, the term of this patent is extended or adjusted under 35 U.S.C. 154(b) by 6 days.

(21) Appl. No.: 11/153,166

(22) Filed: Jun. 15, 2005

(65) Prior Publication Data

US 2005/0284447 A1    Dec. 29, 2005

(30) Foreign Application Priority Data

Jun. 17, 2004 (JP) ............................. 2004-180185
Dec. 16, 2004 (JP) ............................. 2004-363903

(51) Int. Cl.
F02M 55/02 (2006.01)
F02M 55/00 (2006.01)

(52) U.S. Cl. ...................... 123/468; 138/143
(58) Field of Classification Search .............. 123/468, 123/469; 138/143, 141, 142, 145, 140, 177, 138/109; 285/133.5, 189, 188, 332.3
See application file for complete search history.

(56) References Cited

U.S. PATENT DOCUMENTS 2,508,465 A * 5/1950 Offinger et al. ............. 138/142
4,346,739 A * 8/1982 Asada ......................... 138/143
4,784,311 A * 11/1988 Sugao ......................... 228/131
4,832,376 A    5/1989 Sugao
4,893,601 A    1/1990 Sugao
4,900,180 A    2/1990 Takikawa
5,120,084 A    6/1992 Hashimoto
5,143,410 A    9/1992 Takikawa
5,169,182 A * 12/1992 Hashimoto .............. 285/332.2
5,172,939 A   12/1992 Hashimoto (Continued)

FOREIGN PATENT DOCUMENTS

JP    2-80289    6/1990

(Continued)

*Primary Examiner*—Mahmoud Gimie
(74) *Attorney, Agent, or Firm*—Gerald E. Hespos; Anthony J. Casella

(57) ABSTRACT

A joint structure connects a diverging branch pipe to a fuel rail for an internal combustion engine. The fuel rail is stainless steel or steel with rust prevention processing on at least the inner face. The diverging branch pipe is a double pipe with inner and outer pipes. The inner pipe has excellent rust preventing ability with respect to fuel on its inner face in comparison with the outer face of the outer pipe. The inner and outer pipes are connected by a nut for fastening through a joint fitting. A connecting seal portion of the diverging branch pipe and the joint fitting has rust preventing ability equal to that of the inner circumferential face of the diverging branch pipe. An entire liquid contact portion, including a seal face of the diverging branch pipe with respect to the fuel is covered with the inner pipe.

17 Claims, 15 Drawing Sheets

U.S. PATENT DOCUMENTS

| | | | |
|---|---|---|---|
| 5,265,793 A * | 11/1993 | Usui et al. ................. 228/127 |
| 5,520,223 A * | 5/1996 | Iorio et al. .................. 138/140 |
| 5,667,255 A | 9/1997 | Kato |
| 5,887,628 A * | 3/1999 | Usui ........................... 138/142 |
| 5,887,910 A | 3/1999 | Usui |
| 5,903,964 A | 5/1999 | Uematsu et al. |
| 5,957,507 A | 9/1999 | Asada |
| 5,979,945 A | 11/1999 | Hitachi et al. |
| 5,992,904 A | 11/1999 | Hitachi et al. |
| 6,050,301 A * | 4/2000 | Yoshida et al. ............. 138/143 |
| 6,050,611 A | 4/2000 | Asada |
| 6,070,618 A | 6/2000 | Iwabuchi |
| 6,126,208 A | 10/2000 | Asada et al. |
| 6,205,661 B1 * | 3/2001 | Ring ....................... 29/890.01 |
| 6,397,881 B1 | 6/2002 | Asada et al. |
| 6,408,826 B2 | 6/2002 | Asada et al. |
| 6,415,768 B1 | 7/2002 | Usui |
| 6,463,909 B2 | 10/2002 | Asada et al. |
| 6,494,183 B2 | 12/2002 | Usui et al. |
| 6,659,137 B2 * | 12/2003 | Imasaki et al. ............. 138/142 |
| 6,840,283 B2 | 1/2005 | Furugen et al. |
| 6,843,275 B2 | 1/2005 | Kato |
| 2006/0037660 A1 * | 2/2006 | Kinnally et al. ............ 138/143 |

FOREIGN PATENT DOCUMENTS

| | | |
|---|---|---|
| JP | 3-177693 | 8/1991 |
| JP | 4-175462 | 6/1992 |
| JP | 05-009786 | 1/1993 |
| JP | 05-156494 | 6/1993 |
| JP | 11-117826 | 4/1999 |
| JP | 2003-278623 | 10/2003 |

* cited by examiner

FIG. 1 3 (a)
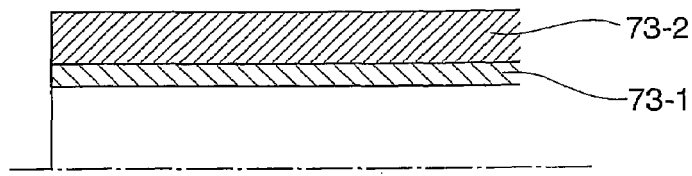
FIG. 1 3 (b)
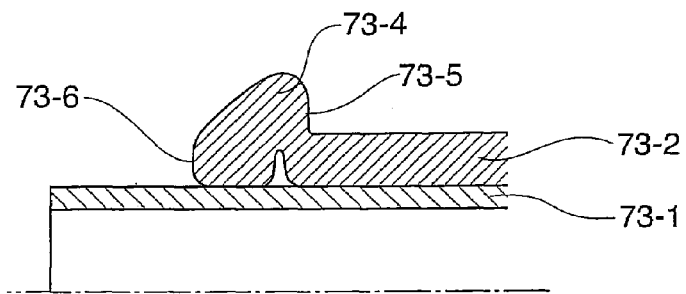
FIG. 1 3 (c)
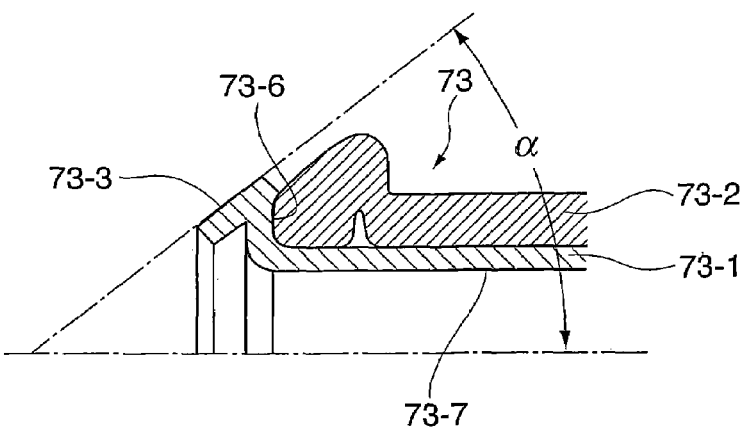

JOINT STRUCTURE OF DIVERGING BRANCH PIPE IN FUEL RAIL FOR INTERNAL COMBUSTION ENGINE, DIVERGING BRANCH PIPE AND MANUFACTURE METHOD OF ITS DIVERGING BRANCH PIPE

TECHNICAL FIELD

The present invention relates to a joint structure of a diverging branch pipe in a fuel rail for an internal combustion engine, and its manufacture method, and more particularly, relates to the joint structure of a diverging branch pipe in the fuel rail (delivery pipe) for a gasoline engine of a direct cylinder interior injection type or a gasoline engine of an intake pipe interior injection type (delivery pipe), or the fuel rail for a diesel engine, the diverging branch pipe, and a manufacture method of this diverging branch pipe.

BACKGROUND ART

As the joint structure of the diverging branch pipe in the fuel rail for the internal combustion engine, there is a structure in which a joint fitting (nipple) is mutually joined (brazed, etc.) to a through hole communicated with a circulating path arranged in a circumferential wall portion of a rail main body in a fitting insertion state, and the diverging branch pipe is fastened and connected to this joint fitting by a nut (see JP-A-2003-278623). In the joint of the diverging branch pipe in the fuel rail for the direct injection gasoline engine of such a structure, nickel plating is performed on at least the inner circumferential faces of the fuel rail and the diverging branch pipe and the surface of an iron foundation, or a copper plating film for brazing and a copper solder material is covered to prevent corrosion due to oxidation of the fuel. However, in the joint structure of the above structure, the fuel (gasoline) has an oxidizing action by direct contact with the surface of the iron foundation, or the copper plating film and the copper solder material in the circulating path, and is oxidized. Sour gasoline raised in corrosive property by the oxidation corrodes the iron foundation or the aluminum surface of a constructional part. Therefore, electroless nickel plating is performed in an entire product, and a nickel plating film is arranged on the inner circumferential faces of the rail and the branch joint. Further, in view of the prevention of atmospheric pollution, a method for performing chemical tinning after copper brazing instead of the above electroless nickel plating is also known (JP-A-11-117826). Further, a structure for forming Ni or a Ni base alloy plating film on the inner and outer faces of the fuel rail is known. Further, a structure for setting the diverging branch pipe to a double pipe is also known. In this structure, a SUS pipe or an alloy plating pipe of Ni or a Ni base on the inner face is used on the inner pipe side, and this inner face is set to the alloy plating pipe of the Ni base. The plating layer of one kind among Ni, Co and alloys with these elements as bases is formed as a first plating layer. A single metal or an alloy layer having a melting point lower than that of the above first plating layer forming metal or an alloy with these metals as bases is formed as a second plating layer on this first plating layer. Electric sewing tubulization is performed by using a band steel plate forming these two plating layers therein. Next, it is known that a welding pipe (JP-A-5-9786 and JP-A-5-156494) having no exposed portion of the steel foundation by performing heating processing is used.

DISCLOSURE OF INVENTION

However, in the above conventional joint structure, a liquid contact portion (a portion coming in contact with the fuel) in which the SUS, or Ni and the Ni base alloy do not exist is caused in a connecting seal portion of the diverging branch pipe and the joint fitting. Therefore, the oxidizing action of the fuel is promoted, and the formation of the sour gasoline is accelerated. Thus, the iron foundation or the aluminum surface of the constructional part such as the fuel rail, the diverging branch pipe, etc. is corroded. Further, the corrosive property with respect to iron is increased by increasing the including amount of biofuel, etc. as an exhaust gas countermeasure. In addition to this, as the injection pressure of the fuel is raised to 15 to 200 MPa, the fuel temperature is raised and the decomposition of the fuel and the corrosive property are further raised. Even when the above liquid contact portion is a narrow portion, the generation of rust becomes a great problem. Further, as the injection pressure is raised, the fastening force of a nut is raised. Separation of the plating film formed in a main pipe rail and the diverging branch pipe is generated by detaching piping plural times, and its separating powder is attached to a seat face of an injecting valve, etc. Therefore, there is a fear that an abnormality is caused in the injection of the fuel. Thus, such unsolved problems were left in the conventional joint structure.

The present invention is made to solve such problems, and proposes a joint structure of a diverging branch pipe in the fuel rail for the internal combustion engine able to prevent the corrosion of a constructional part such as the fuel rail, the diverging branch pipe, etc., and firmly secure the maintenance of air tightness on a connecting seal face and prevent the oxidation and deterioration of the fuel, the diverging branch pipe, and a manufacture method of this diverging branch pipe.

The joint structure of the diverging branch pipe in the fuel rail for an internal combustion engine in the present invention for solving the above problems is a joint structure in which the fuel rail for an internal combustion engine manufactured by stainless steel or manufactured by steel performed with respect to rust prevention processing on at least the inner face, and the diverging branch pipe constructed by a double pipe formed by an outer pipe and an inner pipe having excellent rust preventing ability with respect to fuel on its inner circumferential face in comparison with the outer circumferential face of the outer pipe are connected by a nut for fastening through a joint fitting; wherein a connecting seal portion of the diverging branch pipe and the joint fitting has rust preventing ability equal to that of the inner circumferential face of the diverging branch pipe; an entire liquid contact portion including a seal face of the diverging branch pipe with respect to the fuel is covered with the inner pipe; and a pressure receiving portion of the inner pipe including the seal face is constructed so as to be supported by the outer pipe.

In the joint structure of the above diverging branch pipe in the present invention, the connecting seal portion of the joint fitting is formed in a concave sectional shape having a flat face perpendicular to the axis of a branching hole of the joint fitting, and an opening end face of the outer pipe is bent so as to be covered with an opening end portion of the inner pipe, and the diverging branch pipe formed so as to set the inner circumferential face of the inner pipe to a seat face is connected by the nut for fastening assembled into this diverging branch pipe in advance.

In the connecting structure of the above diverging branch pipe in the present invention, a gasket is interposed between the connecting seal portion of the joint fitting and a seat face of the diverging branch pipe, and the connecting construction is set by the nut for fastening assembled into this diverging branch pipe in advance.

In the connecting structure of the above diverging branch pipe in the present invention, a spool or a projection is arranged at the terminal of the diverging branch pipe, and is set to the pressure receiving portion of the nut for fastening.

In the joint structure of the diverging branch pipe in the fuel rail for an internal combustion engine in the present invention, the connecting seal portion of the joint fitting is formed in a conical convex shape, and a seat face of the diverging branch pipe is formed in a single flare shape, and a conical gasket of a ring shape is interposed between the connecting seal portion of the conical convex shape and the seat face of the single flare shape, and the connecting construction is performed by the nut for fastening assembled into the diverging branch pipe in advance.

In the connecting structure of the above diverging branch pipe in the present invention, the connecting seal portion of the joint fitting is formed in a conical concave shape, and a seat face of the diverging branch pipe is formed in a single flare shape, and a conical gasket of an abacus ball shape is interposed between the connecting seal portion of the conical concave shape and the seat face of the single flare shape, and the connecting construction is performed by the nut for fastening assembled into the diverging branch pipe in advance.

In the joint structure of the diverging branch pipe in the fuel rail for an internal combustion engine in the present invention, a taper of a concave shape having an inclination angle $\alpha$ with respect to the axis of a branching hole is formed in the connecting seal portion of the joint fitting; a connecting head portion of the outer pipe of the diverging branch pipe is formed in a shape having a taper wall of a convex shape having an inclination angle $\alpha \pm 5°$ correspondingly to the taper face of the concave shape having the inclination angle $\alpha$ in the connecting seal portion of the joint fitting; a seat face of a ring shape is formed by bending the tip of the inner pipe outside so as to cover the connecting head portion of the outer pipe having the taper wall of the convex shape; a conical gasket approximately formed in a ring shape is interposed between this seat face and the taper face of the joint fitting; and the connecting construction is performed by the nut for fastening assembled into the diverging branch pipe in advance.

In the joint structure of the above diverging branch pipe in the present invention, the inclination angle $\alpha$ is set to 50° to 120° with respect to the axis of the branching hole of the joint fitting.

In the joint structure of the above diverging branch pipe in the present invention, the tip shape of the connecting head portion of the diverging branch pipe is formed approximately perpendicularly to the axis of the diverging branch pipe, and the seat face of the inner pipe covering the connecting head portion is formed on the taper wall face of a turning-up double structure.

The joint structure of the diverging branch pipe in the fuel rail for an internal combustion engine in the present invention is also a joint structure in which the fuel rail for an internal combustion engine manufactured by stainless steel or manufactured by steel performed with respect to rust prevention processing on at least the inner face, and the diverging branch pipe constructed by a double pipe formed by an outer pipe and an inner pipe having excellent rust preventing ability with respect to fuel on its inner circumferential face in comparison with the outer circumferential face of the outer pipe are connected by a nut for fastening through a joint fitting; wherein a connecting seal portion of the joint fitting is set to a flat face; a diameter enlarging portion is arranged in a terminal portion of the diverging branch pipe and a pressure receiving portion is formed on the outer circumferential face of this diameter enlarging portion; a gasket is interposed between a seat face of a connecting head portion connected to this pressure receiving portion and the flat face of the joint fitting; a pressing seating face portion formed in a washer assembled onto the diverging branch pipe side in advance is abutted and engaged with the pressure receiving portion formed on the outer circumferential face of the diameter enlarging portion of the diverging branch pipe; and the connecting construction is performed by the nut for fastening.

The joint structure of the diverging branch pipe in the fuel rail for an internal combustion engine in the present invention is also a joint structure in which the fuel rail for an internal combustion engine is manufactured by stainless steel or is manufactured by steel performed with respect to rust prevention processing on at least the inner face; the diverging branch pipe has a connecting head portion of a cutting head conical shape, an arc shape or an abacus ball shape constituting a pressing face to a partner seating portion in a connecting end portion; the diverging branch pipe is formed by internally mounting a thin inner pipe manufactured by stainless steel in a close fitting shape over the entire circumferential face length of a circulating hole of the axial interior; and the fuel rail for an internal combustion engine and the diverging branch pipe are connected by a nut for fastening through a joint fitting; wherein a seat face is formed by outside bending the tip portion of the inner pipe manufactured by stainless steel so as to cover the tip portion of the connecting head portion; and the seat face and a pressure receiving face of the joint fitting are abutted and engaged and a connecting construction is performed by the nut for fastening.

Further, in the above joint structure, the outside bent portion of the inner pipe manufactured by stainless steel and covering the tip portion of the connecting head portion is buried into the connecting head portion so as to be located on the same face as the tip portion of the connecting head portion so that the seat face is formed.

The diverging branch pipe in the fuel rail for an internal combustion engine in the present invention is essentially a diverging branch pipe in the fuel rail for an internal combustion engine in which the diverging branch pipe is constructed by a double pipe formed by an outer pipe and an inner pipe; the inner pipe is constructed by a stainless steel pipe or a pipe body having a rust preventing film on the inner circumferential face; the diverging branch pipe is set to a structure for covering an opening end face of the outer pipe with an opening end portion of the inner pipe so as to set the inner circumferential face of the inner pipe to a seat face; an entire liquid contact portion including a seal face with respect to fuel is covered with the inner pipe; a pressure receiving portion of the inner pipe is supported by the outer pipe; and a spool or a projection as the pressure receiving portion of a nut for fastening is arranged in a terminal portion.

In the above diverging branch pipe in the present invention, the rust preventing film of the inner pipe is constructed by a film of plural layers or a diffused single layer of a Ni plating film, a Ni base alloy film, or the Ni plating film and a Ni—P alloy plating film.

The present invention further essentially resides in a manufacture method of a diverging branch pipe in a fuel rail for an internal combustion engine in which a double pipe is constructed by an outer pipe and an inner pipe; both the outer pipe and the inner pipe of the double pipe are simultaneously pushed-in by a punch in the pipe axis direction; a spool or a projection as a pressure receiving portion of a nut is formed by the outer pipe and the inner pipe by this pushing-in; a pipe end portion of the inner pipe is next projected by cutting and removing a pipe end portion of the outer pipe on the side of a connecting end portion; the projecting portion of the inner pipe is then bent outside and covers a pipe end face of the connecting end portion side of the outer pipe; and a seat face is formed by the inner circumferential face of the inner pipe.

In the manufacture method of the above diverging branch pipe in the present invention, it is also characterized in that a double pipe is constructed by an outer pipe and an inner pipe; only the outer pipe of the double pipe is pushed-in by a punch in the pipe axis direction; a spool or a projection as a pressure receiving portion of a nut for fastening is formed by only the outer pipe by this pushing-in; a projecting portion of the inner pipe projected from a connecting side pipe end of the outer pipe is next bent and covers the connecting side pipe end face of the outer pipe while this projecting portion is enlarged in diameter outside; and a seat face is formed by the inner circumferential face of the inner pipe.

In the manufacture method of the above diverging branch pipe in the present invention, it is also characterized in that a double pipe is constructed by an outer pipe and an inner pipe; only the outer pipe of the double pipe is pushed-in by a punch in the pipe axis direction; a spool or a projection as a pressure receiving portion of a nut for fastening is formed by only the outer pipe by this pushing-in; a connecting head portion having a taper wall of an inclination angle $\alpha$ is formed by processing at a similar inclination angle correspondingly to a concave taper face of the inclination angle $\alpha$ on which a connecting head portion of the outer pipe is formed in a connecting seal portion of the joint fitting; a projecting portion of the inner pipe projected from a connecting side pipe end of the outer pipe is next bent and covers the connecting side pipe end face of the outer pipe while this projecting portion is enlarged in diameter outside; and a seat face having a convex taper wall of an inclination angle $\alpha \pm 5°$ is formed on the inner circumferential face of the inner pipe.

In the manufacture method of the above diverging branch pipe in the present invention, the inclination angle $\alpha$ is set to 50° to 120° with respect to the axis of a branching hole of the joint fitting.

Further, in the manufacture method of the above diverging branch pipe in the present invention, the taper wall of the inclination angle $\alpha$ formed in the connecting head portion of the outer pipe is formed by cutting using mechanical means in a preferable mode.

In the manufacture method of the diverging branch pipe in the above fuel rail for an internal combustion engine in the present invention, the connecting head portion of the outer pipe is formed approximately perpendicularly to the axis of the diverging branch pipe, and the inner pipe covering the connecting head portion of the outer pipe is formed on the taper wall face of a turning-up double structure.

The present invention also essentially resides in a manufacture method of a diverging branch pipe in a fuel rail for an internal combustion engine in which the diverging branch pipe has a connecting head portion of a cutting head conical shape, an arc shape or an abacus ball shape constituting a pressing face to a partner seating portion in a connecting end portion; a thin inner pipe manufactured by stainless steel is internally mounted in a close fitting shape over the entire circumferential face length of a circulating hole of the axial interior; and a seat face is formed by outside bending the tip portion of the inner pipe manufactured by stainless steel so as to cover the tip portion of the connecting head portion; wherein only an outer pipe of the pipe body internally mounting the thin inner pipe manufactured by stainless steel in the close fitting shape over the entire circumferential face length of the circulating hole of the axial interior is pushed-in by a punch in the pipe axis direction; the connecting head portion is formed and the inner pipe is simultaneously projected by this pushing-in; the projecting portion of the inner pipe projected from a connecting side pipe end of the outer pipe is next bent and covers the tip portion of the connecting head portion of the outer pipe while this projecting portion is enlarged in diameter outside; and the seat face is formed by the inner circumferential face of the inner pipe. The pushing-in may be also performed by the punch in the pipe axis direction so as to set the outer pipe to be long and set the inner pipe to be short in a process for forming the connecting head portion.

In the manufacture method of the above diverging branch pipe in the present invention, when the seat face is formed by bending the projecting portion of the inner pipe while this projecting portion is enlarged in diameter outside, a cored bar is inserted into the inner pipe manufactured by stainless steel, and the projecting portion of the inner pipe is bent while this projecting portion is enlarged in diameter outside.

Further, in the manufacture method of the above diverging branch pipe in the present invention, the seat face is formed by burying the projecting portion of the inner pipe into the connecting head portion such that the outside bent portion of the inner pipe manufactured by stainless steel and covering the tip portion of the connecting head portion is set to the same face as the tip portion of the connecting head portion.

In the joint structure of the present invention, the liquid contact portion of the fuel rail and the diverging branch pipe is formed by stainless steel or the Ni plating film and the Ni base alloy plating film having the corrosion resisting property with respect to the fuel. Therefore, in the fuel rail and the diverging branch pipe, a state perfectly protected from a corrosive environment is secured, and an excellent function on a corrosion preventing face is guaranteed. Further, the diverging branch pipe is constructed by the double pipe formed by the outer pipe and the inner pipe. The inner pipe is constructed by a stainless steel pipe or a pipe body in which a rust preventing film such as Ni or the Ni base alloy film, etc. is formed on the inner circumferential face. The entire liquid contact portion including the seal face with respect to the fuel is covered with the inner pipe. The pressure receiving portion, etc. including the seat face formed by the inner pipe are supported so as to be protected by the outer pipe. Thus, a strong connecting state is maintained in a healthy state, and the inner circumferential face of the inner pipe becomes the seat face. Therefore, the diverging branch pipe sufficiently resists the use of lower gasoline, sour gasoline, DME (dimethyl ether), alcohol, alcohol composite fuel, light oil, hydrogen, etc. Further, since no film of copper exists on the inner circumferential face, no deterioration of the fuel is caused. Further, when the connecting construction is set by interposing the gasket between the joint fitting and the diverging branch pipe, the seat face is formed through the gasket. Therefore, a more excellent airtight property is secured, and each of various kinds of fuels of a high pressure of 15 to 200 MPa can be more reliably sealed. In accordance with the manufacture method of the diverging branch pipe of the present invention, a state perfectly protected from the corrosive environment is secured by a simple operation, and the diverging branch pipe having an excellent function on the corrosion preventing face can be obtained. Therefore, the diverging branch pipe excellent in characteristics for preventing the deterioration of the fuel in advance, etc. can be provided at low cost.

BRIEF DESCRIPTION OF THE DRAWINGS

FIGS. 13(a) to 13(c) are semi-cutting process views schematically showing a fourth embodiment of the manufacture method of the diverging branch pipe.

BEST MODE FOR CARRYING OUT THE INVENTION

Figure 1:
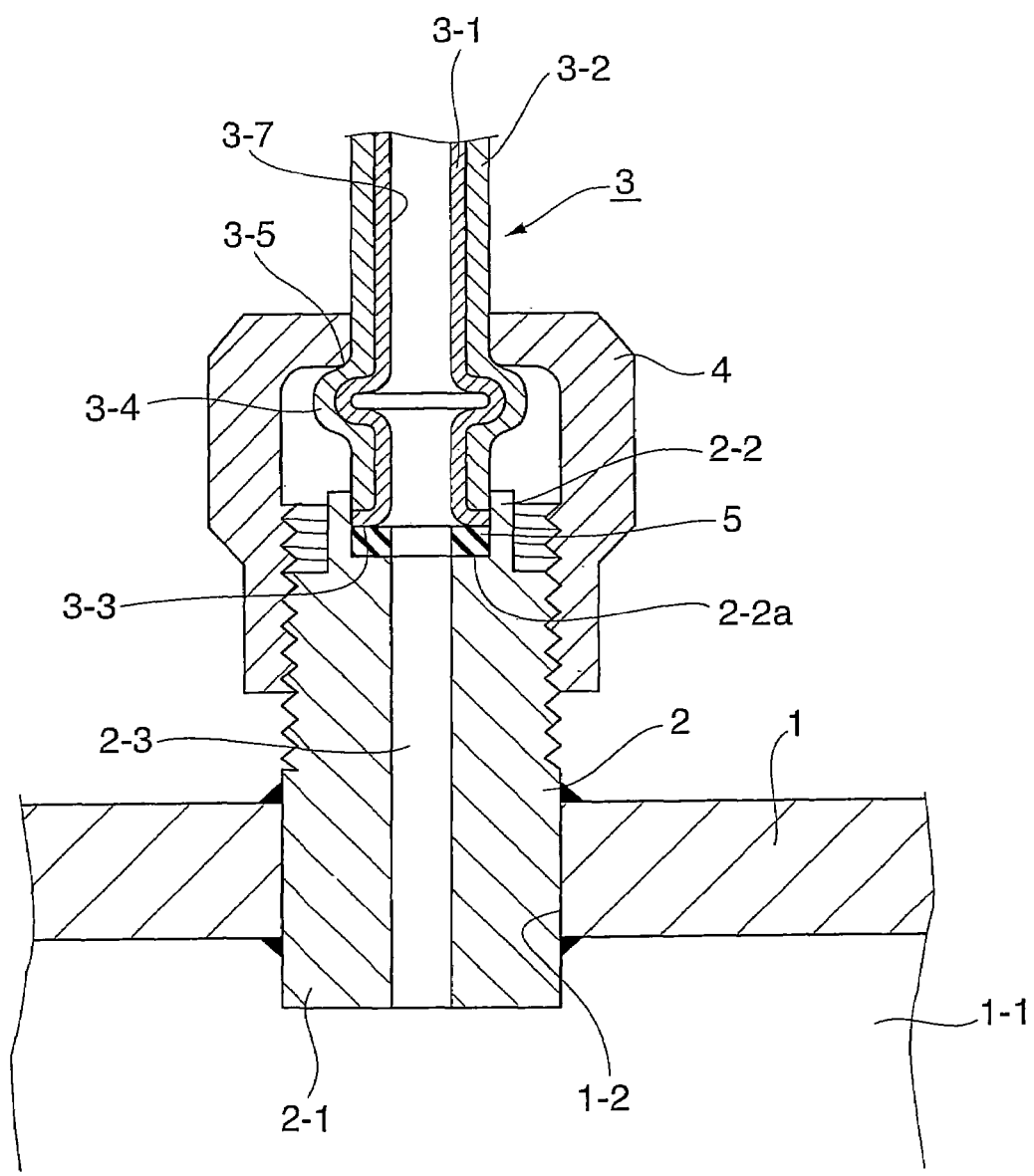
FIG. 1 is a schematic longitudinal sectional view of a main portion showing a first embodiment of a joint structure of a diverging branch pipe in a fuel rail for an internal combustion engine of the present invention.

A main pipe rail in accordance with the connecting structure of a diverging branch pipe in a fuel rail for an internal combustion engine of the present invention is constructed by a rail of a tubular shape manufactured by a pressure piping carbon steel pipe of a pipe diameter of about 30 m/m or less with the interior as a circulating path, a thick steel pipe material such as a stainless steel pipe, etc., or a sheet metal from a steel plate. Rust prevention processing such as nickel plating or nickel base alloy plating, etc. is performed in at least a portion of the inner face of the main pipe rail coming in contact with fuel. A through hole for a branching connecting body is bored in a single place or plural places held with respect to distances on the inner circumferential wall face of a circumferential wall portion extended in the axial direction and communicated with the circulating path.

Instead of the above steel material in the present invention, for example, it is also possible to adopt a heat resisting property metallic material having high strength and an excellent high corrosion resisting property such as inconel, hastelloy, titanium, a titanium base alloy or a nickel base alloy, etc. except for the stainless steel.

On the other hand, a joint fitting for connecting the diverging branch pipe is a cylindrical body axially having a branching hole as a flow path for high pressure fuel. A male screw screwed to a nut for fastening assembled into the diverging branch pipe is formed on the outer circumferential face of an outward connecting seal portion of this joint fitting. The joint fitting is constructed by a steel pipe material or a steel material of the same kind as the main pipe rail or a kind different from that of the main pipe rail together with the diverging branch pipe and the nut for fastening. A connecting end portion of the joint fitting is fitted and inserted into the through hole of the above main pipe rail, and its tip portion is projected into the circulating path of the main pipe rail and is joined by brazing, etc.

The diverging branch pipe for high pressure fuel injection is basically constructed by a double pipe formed by an inner pipe and an outer pipe. In the inner pipe, a pipe material itself is constructed by a corrosion resisting property steel pipe material such as a stainless steel pipe, etc. Otherwise, rust prevention processing of nickel plating or nickel base alloy plating, etc. is performed on at least the inner circumferential face of the inner pipe. The inner pipe has excellent corrosion preventing performance with respect to the fuel in comparison with the outer circumferential face of the outer pipe. Furthermore, a seat face is formed so as to cover an opening end portion of the outer pipe with an opening end portion of the inner pipe. A gasket is preferably interposed between this seat face and the connecting seal portion of the above joint fitting. As pressing using a box nut for fastening assembled into the diverging branch pipe in advance is performed, the nut for fastening is screwed to a pressure receiving portion formed by a spool, etc. arranged at the terminal of the diverging branch pipe. Thus, the connecting structural body of the diverging branch pipe in the fuel rail for an internal combustion engine in the present invention is constructed.

The cylindrical portion of the above joint fitting in the present invention is about 14 m/m in outside diameter and about 4 m/m in thickness. No joining means of the above main pipe rail and the joint fitting is limited in a range able to be strongly joined and assembled in a maintaining state of high air tightness. However, brazing using copper solder or nickel solder is normally preferable correspondingly to the quality of the used steel material. Continuous brazing using furnace brazing is more preferably adopted.

The present invention will next be further explained in detail on the basis of the accompanying drawings. The present invention is not restricted to these contents, but can be freely designed and changed within the scope of the gist of the present invention.

In the present invention, in the drawings, reference numerals 1, 11, 21, 31, 41, 51, 61, 71, 81 designate main pipe rails, and reference numerals 2, 12, 22, 32, 42, 52, 62, 72, 82 designate joint fittings. Reference numerals 3, 13, 23, 33, 43, 53, 63, 73, 83 designate diverging branch pipes, and reference numerals 4, 14, 24, 34, 44, 54, 64, 74, 84 designate nuts for fastening. Reference numerals 5, 15, 25, 35, 45, 55, 65, 75 designate gaskets.

EMBODIMENTS

Embodiment 1

In the joint structure of a diverging branch pipe in the fuel rail for an internal combustion engine of a first embodiment shown in FIG. 1, a through hole 1-2 communicated with a circulating path 1-1 for fuel is arranged in a circumferential wall portion of a main pipe rail 1. A connecting end portion 2-1 of a joint fitting 2 is mutually joined to this through hole 1-2 in a state in which the tip portion of the connecting end portion 2-1 is fitted and inserted until this tip portion is projected into the circulating path 1-1. Brazing, welding, or diffusion joining, etc. can be arbitrarily selected as a joining means. However, continuous brazing can be efficiently executed by adopting furnace brazing using nickel solder.

In the joint fitting 2, a connecting seal portion 2-2 of a concave shape in section having a flat face 2-2*a* perpendicular to the axis of a branching hole of this joint fitting is arranged in an outward opening end portion. A diverging branch pipe 3 of a double pipe structure is irregularly fitted to this connecting seal portion 2-2 through a gasket 5 of a ring shape. A box nut 4 for fastening assembled into the diverging branch pipe 3 in advance is screwed to a male screw formed on the outer circumferential face of the joint fitting 2. This box nut 4 is fastened and attached as pushing pressure with respect to a pressure receiving portion 3-5 formed by a spool 3-4 arranged at the terminal of the diverging branch pipe 3 is applied. Thus, the joint structure of the diverging branch pipe in the fuel rail for an internal combustion engine in this embodiment is connected and constructed.

The diverging branch pipe 3 is constructed by a double pipe in which an inner pipe 3-1 is formed by a stainless steel pipe and an outer pipe 3-2 is formed by a steel pipe of a normal iron system. A seat face 3-3 is formed by covering an opening end face of the outer pipe 3-2 with an opening end portion of the inner pipe 3-1. The diverging branch pipe 3 is preferably fastened and attached through the gasket 5 of a ring shape between the seat face 3-3 and the flat face 2-2*a* formed in the seal portion 2-2 of the joint fitting 2. Therefore, air tightness with respect to the fuel of high pressure and high temperature is firmly maintained by the pushing pressure of the above seat face 3-3 supported by the outer pipe 3-2. Further, no exposure portion of an iron system material, etc. exists in a liquid contact portion 3-7 with the fuel, and excellent rust preventing ability of the diverging branch pipe 3 is obtained.

In this embodiment, the stainless steel pipe is adopted in the inner pipe 3-1 itself, but a normal iron system steel pipe can be also adopted in the inner pipe 3-1. For example, a rust preventing film of nickel plating, etc. can be also formed on the inner circumferential face of the inner pipe 3-1. The diverging branch pipe 3 of the double pipe structure may be also constructed such that the inner circumferential face of the inner pipe 3-1 becomes the seat face 3-3.

Embodiment 2

Figure 2:
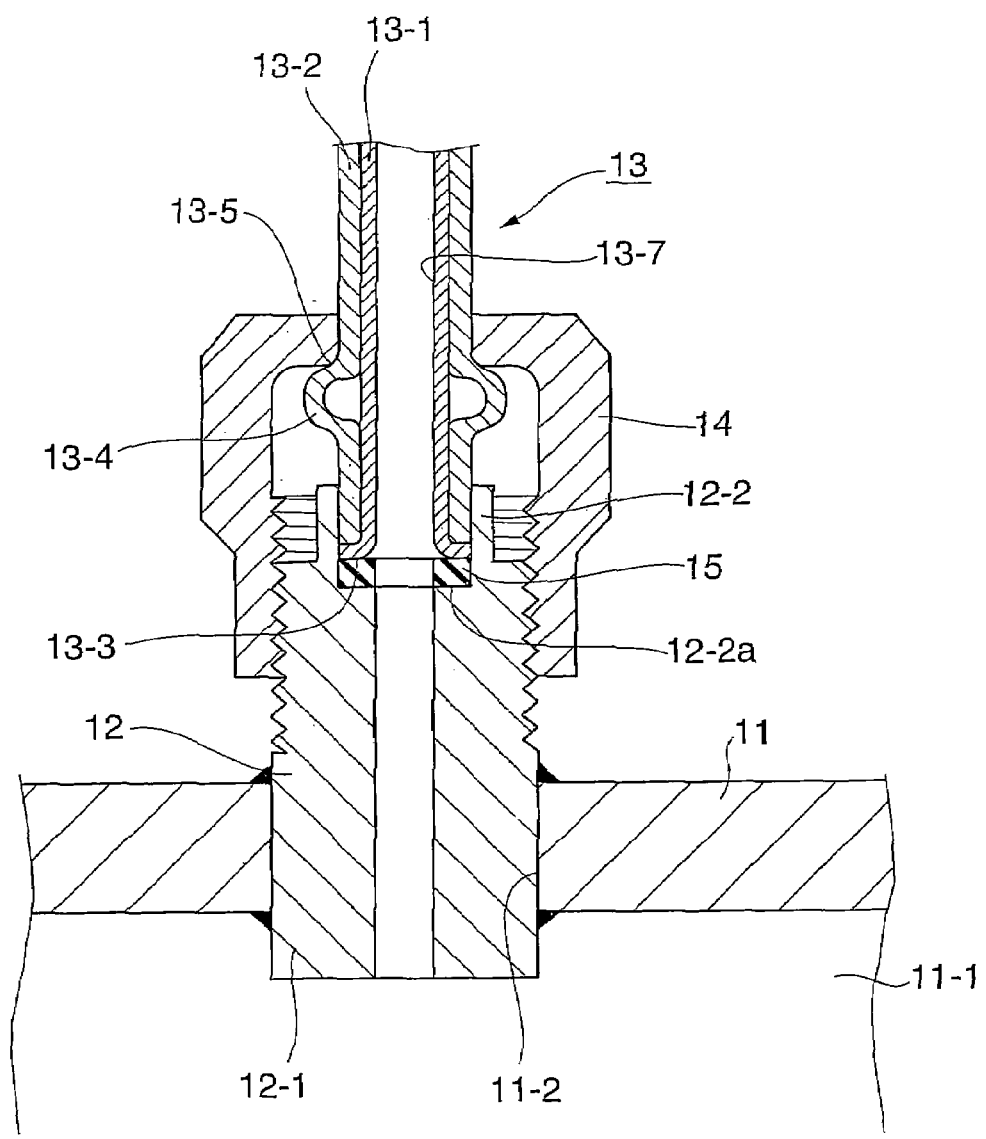
FIG. 2 is a schematic longitudinal sectional view of a main portion showing a second embodiment of the joint structure.

The joint structure of a diverging branch pipe in the fuel rail for an internal combustion engine of a second embodiment shown in FIG. 2 constitutes a joint structure of the diverging branch pipe in the fuel rail for an internal combustion engine similarly to the first embodiment except that a pressure receiving portion 13-5 with respect to a nut 14 for fastening is formed by arranging a spool 13-4 of the diverging branch pipe 13 of a double pipe structure in only an outer pipe 13-2. In this structure, a connecting end portion 12-1 of a joint fitting 12 is mutually joined to a through hole 11-2 communicated with a circulating path 11-1 of fuel arranged in a circumferential wall portion of a main pipe rail 11 in a state in which the connecting end portion 12-1 is internally projected, fitted and inserted into the through hole 11-2. The diverging branch pipe 13 of the double pipe structure is preferably irregularly fitted to a connecting seal portion 12-2 arranged in an outward opening end portion of the joint fitting 12 through a gasket 15 of a ring shape. A box nut 14 for fastening assembled into the diverging branch pipe 13 in advance is screwed to a male screw formed on the outer circumferential face of the joint fitting 12. The box nut 14 is then fastened and attached as pushing pressure with respect to the pressure receiving portion 13-5 formed by the spool 13-4 arranged at the terminal of the diverging branch pipe 13 is applied. Thus, the joint structure of the diverging branch pipe in the fuel rail for an internal combustion engine in this embodiment is connected and constructed.

In this embodiment, the diverging branch pipe 13 is constructed by a double pipe in which an inner pipe 13-1 is formed by a stainless steel pipe and an outer pipe 13-2 is formed by a steel pipe of a normal iron system. Further, a seat face 13-3 is formed by covering an opening end face of the outer pipe 13-2 with an opening end portion of the inner pipe 13-1. The diverging branch pipe 13 is fastened and attached through the gasket 15 of a ring shape between the seat face 13-3 and a flat face 12-2*a* formed in the seal portion 12-2 of the joint fitting 12. Therefore, air tightness with respect to the fuel of high pressure and high temperature is firmly maintained by the pushing pressure of the above seat face 13-3 supported by the outer pipe 13-2. Further, no exposure portion of an iron system material, etc. exists in a liquid contact portion 13-7 with the fuel, and excellent rust preventing ability of the diverging branch pipe 13 is obtained.

Embodiment 3

Figure 3:
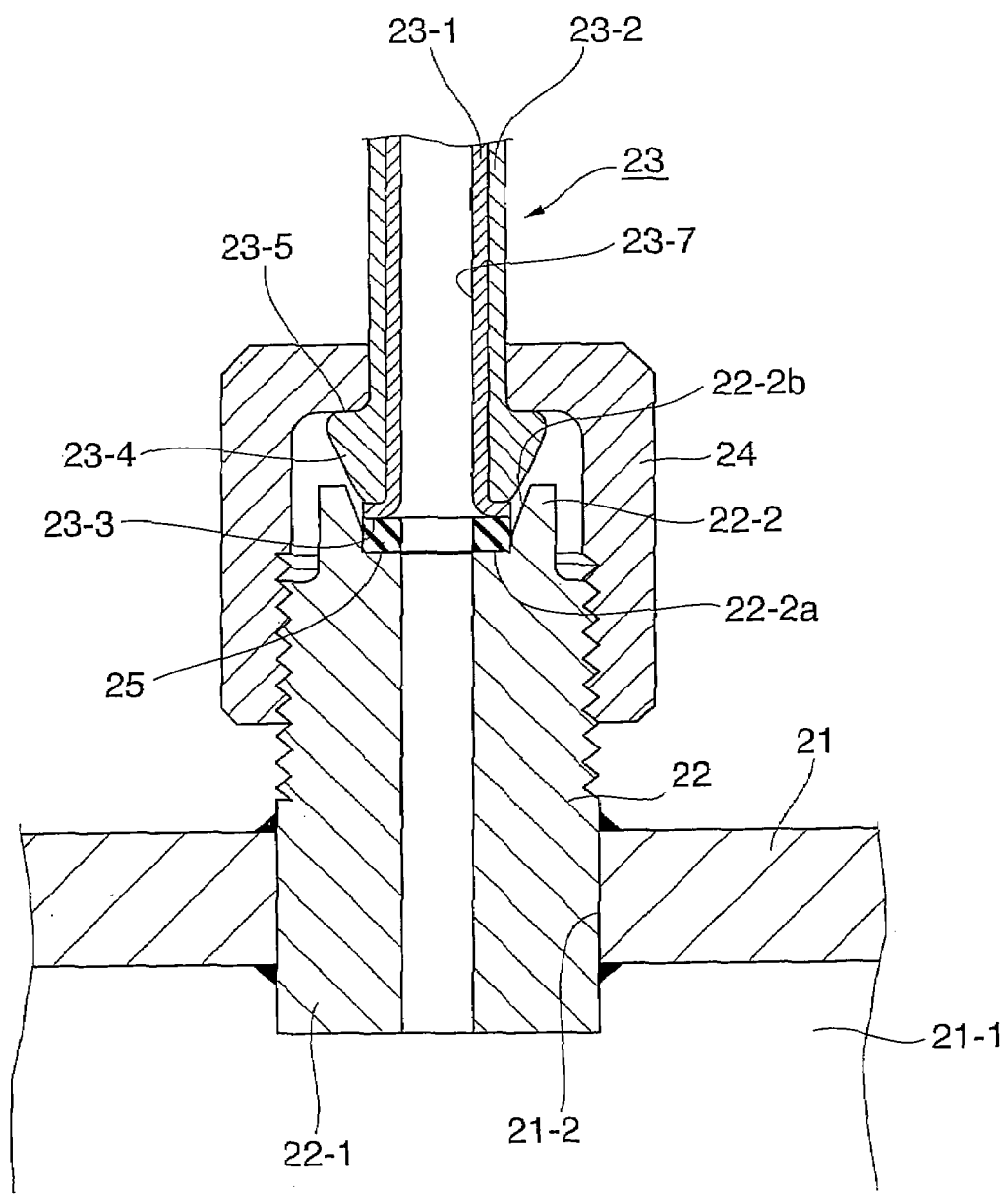
FIG. 3 is a schematic longitudinal sectional view of a main portion showing a third embodiment of the joint structure.

The joint structure of a diverging branch pipe in the fuel rail for an internal combustion engine of a third embodiment shown in FIG. 3 constitutes a joint structure of the diverging branch pipe in the fuel rail for an internal combustion engine similarly to the first embodiment except that a projection 23-4 is formed at the terminal of the diverging branch pipe 23 of a double pipe structure and is set to a pressure receiving portion 23-5 with respect to a nut for fastening, and a connecting seal portion 22-2 of a concave sectional shape having a flat face 22-2*a* perpendicular to the axis of a branch hole of a joining fitting 22 arranged in an outward opening end portion of this joint fitting 22 is set to a slanting face widened outwards. Therefore, air tightness with respect to the fuel of high pressure and high temperature is firmly maintained. Further, no exposure portion of an iron system material, etc. exists in a liquid contact portion 23-7 with the fuel, and excellent rust preventing ability of the joining structure is held in a high degree.

In the diverging branch pipe 23 of the double pipe structure in this embodiment, a connecting head portion 23-4 of a cutting head conical shape is arranged in a connecting head portion of the diverging branch pipe 23. The rear face of the connecting head portion 23-4 is set to a pressure receiving portion 23-5 with respect to a box nut 24 for fastening. A seat face 23-3 is formed in a pipe end portion of the tip of the diverging branch pipe 23 so as to be covered with a pipe end portion of an inner pipe 23-1. Thus, the diverging branch pipe in the fuel rail for an internal combustion engine in the present invention is constructed. The diverging branch pipe 23 of such a double pipe structure is also set to a structure in which the inner pipe 23-1 is constructed by a stainless steel pipe or a pipe body having a rust preventing film on the inner circumferential face, and the opening end face of an outer pipe 23-2 is covered with an opening end portion of the inner pipe 23-1 so as to set the inner circumferential face of the inner pipe 23-1 to the seat face 23-3 as mentioned above.

Embodiment 4

Figure 4:
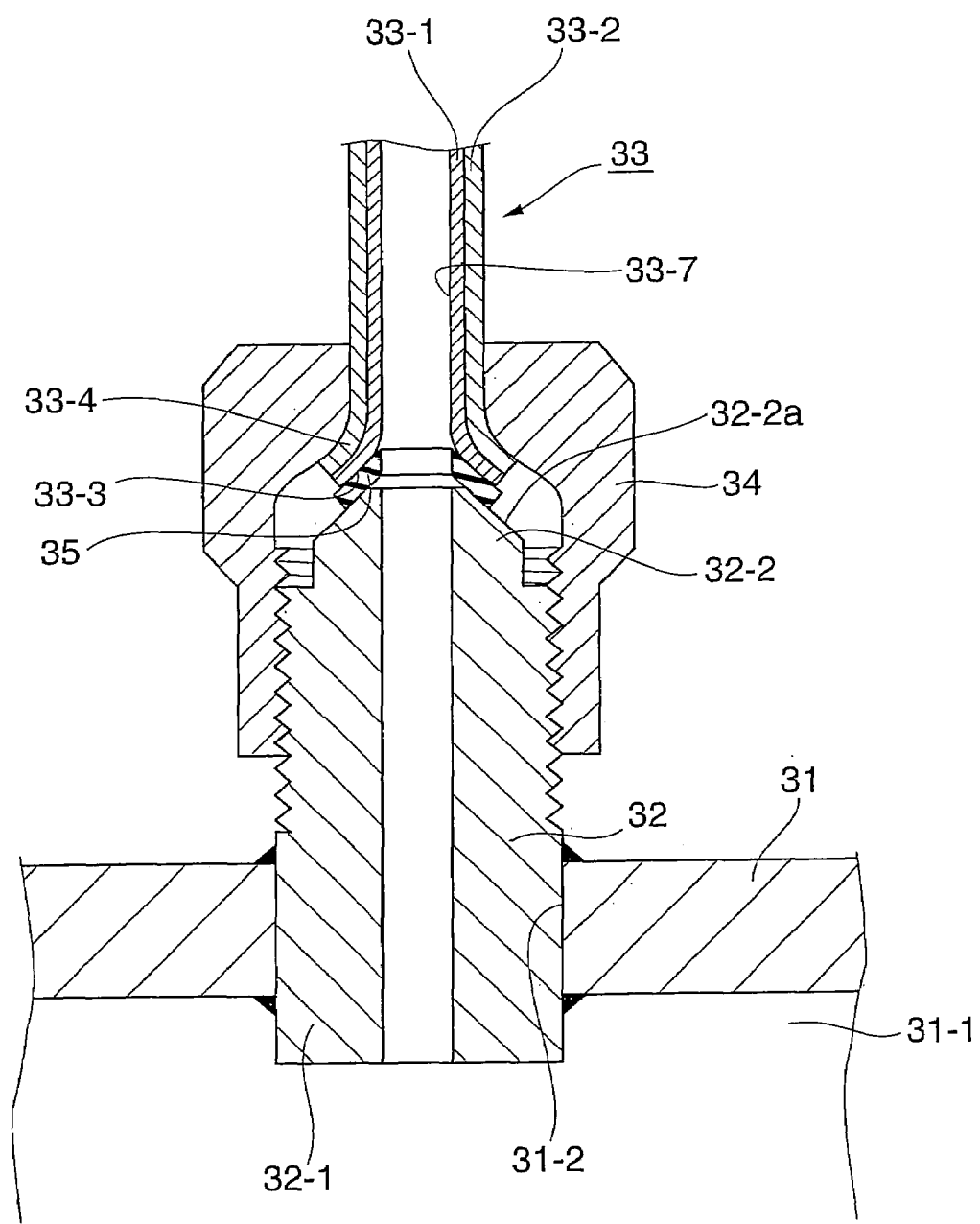
FIG. 4 is a schematic longitudinal sectional view of a main portion showing a fourth embodiment of the joint structure.

The joint structure of a diverging branch pipe in the fuel rail for an internal combustion engine of a fourth embodiment shown in FIG. 4 substantially constitutes a connecting structure of the diverging branch pipe in the fuel rail similarly to each of the above embodiments except that a connecting seal portion 32-2 of a joint fitting 32 is set to a conical convex shape, and an opening terminal portion of the diverging branch pipe is formed in a single flare shape, and the diverging branch pipe is connected and constructed through a conical gasket of a ring shape between the above seal portion 32-2 of the conical convex shape and a seat face 33-3 of the above single flare shape. Thus, equal effects are approximately obtained in the maintenance of air tightness with respect to the fuel of high pressure and high temperature, and rust preventing ability.

This joining structure will be explained more concretely. A connecting end portion 32-1 of a joint fitting 32 is mutually joined to a through hole 31-2 communicated with a circulating path 31-1 of fuel arranged in a circumferential wall portion of a main pipe rail 31 in a state in which the connecting end portion 32-1 is internally projected, fitted and inserted into the through hole 31-2. A tip seat face 33-3 of the diverging branch pipe 33 of a double pipe structure is preferably abutted and fitted to a connecting seal portion 32-2 of a conical convex shape having a conical slanting face 32-2a arranged in an outward opening end portion of the joint fitting 32 through a conical gasket 35 of a ring shape. The outer circumferential face of a single flare portion 33-4 arranged at the terminal of the diverging branch pipe 33 is set to a pressure receiving portion. As pushing pressure using a box nut 34 for fastening assembled into the diverging branch pipe 33 in advance is applied, the box nut 34 is screwed to a male screw of the joint fitting 32 and is fastened and attached by this screwing so that the diverging branch pipe 33 is connected and constructed. In the diverging branch pipe 33 of the above double structure, an inner pipe 33-1 is constructed by a stainless steel pipe or a pipe body having a rust preventing film on the inner circumferential face. The opening end faces (connecting seal portions) of the inner pipe 33-1 and an outer pipe 33-2 are formed in a single flare shape so as to set the inner circumferential face of the inner pipe 33-1 to the seat face 33-3.

Embodiment 5

Figure 5:
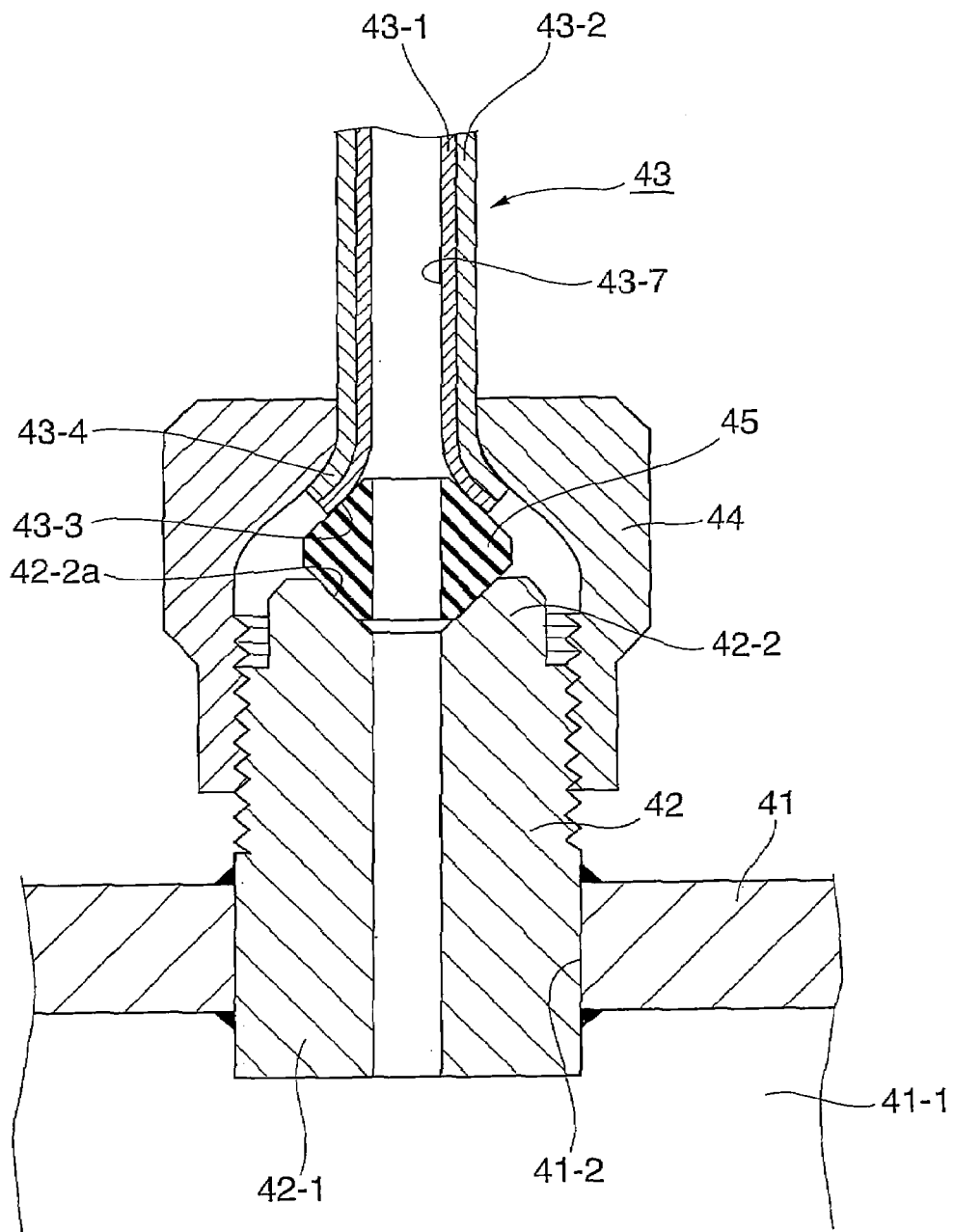
FIG. 5 is a schematic longitudinal sectional view of a main portion showing a fifth embodiment of the joint structure.

The joint structure of a diverging branch pipe in the fuel rail for an internal combustion engine of a fifth embodiment shown in FIG. 5 is set to a construction similar to the joint structure shown in the above fourth embodiment except that a connecting seal portion 42-2 of a joint fitting 42 is set to a taper wall of a concave sectional shape enlarged in diameter outwards from the axis of the joint fitting 42, and a gasket interposed between the connecting seal portion 42-2 and a seat face 43-3 of a single flare shape formed at the opening terminal of the diverging branch pipe 43 is set to a gasket 45 of an abacus ball shape instead of the above conical gasket 35 of the ring shape. In this structure, a connecting end portion 42-1 of the joint fitting 42 is mutually joined to a through hole 41-2 communicated with a circulating path 41-1 of fuel arranged in the circumferential wall portion of a main pipe rail 41 in a state in which the connecting end portion 42-1 is internally projected, fitted and inserted into the through hole 41-2. A tip seat face 43-3 of the diverging branch pipe 43 of a double pipe structure is abutted and fitted to a connecting seal portion 42-2 of a conical convex shape having a conical slanting face 42-2a arranged in an outward opening end portion of the joint fitting 42 through the gasket 45 of the abacus ball shape. The outer circumferential face of a single flare portion 43-4 arranged at the terminal of the diverging branch pipe 43 is set to a pressure receiving portion. As pushing pressure using a box nut 44 for fastening assembled into the diverging branch pipe 43 in advance is applied, the box nut 44 is screwed to a male screw of the joint fitting 42 and is fastened and attached so that the diverging branch pipe is connected and constructed. In the diverging branch pipe 43 of the above double pipe structure, an inner pipe 43-1 is also constructed by a stainless steel pipe or a pipe body having a rust preventing film on the inner circumferential face. The opening end faces (connecting seal portions) of the inner pipe 43-1 and an outer pipe 43-2 are formed in a single flare shape so as to set the inner circumferential face of the inner pipe 43-1 to the seat face 43-3.

Accordingly, in the joint structure in accordance with this embodiment, equal effects are approximately obtained in the maintenance of air tightness with respect to the fuel of high pressure and high temperature, and rust preventing ability.

Embodiment 6

Figure 6:
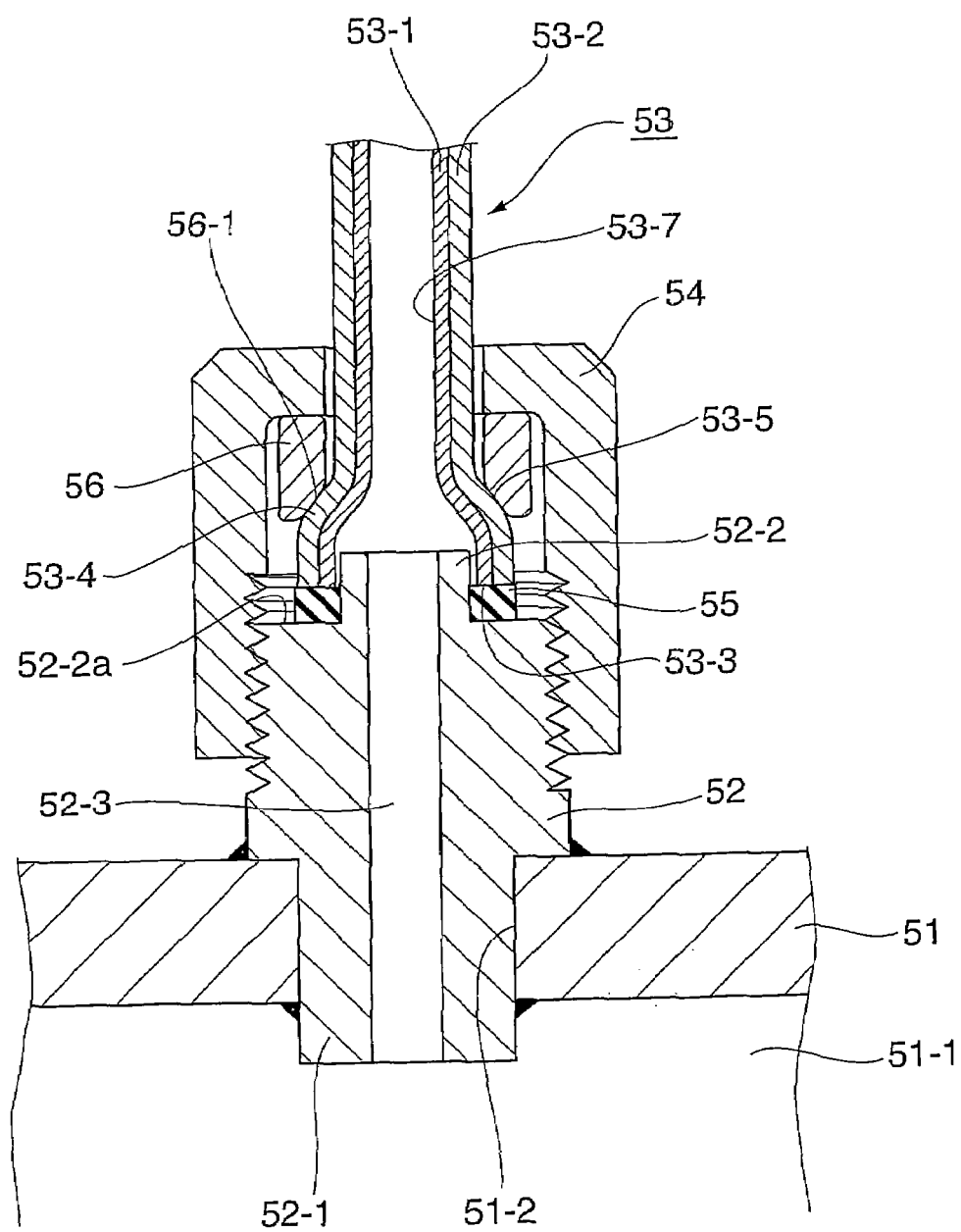
FIG. 6 is a schematic longitudinal sectional view of a main portion showing a sixth embodiment of the joint structure.

In the joint structure of a diverging branch pipe in the fuel rail for an internal combustion engine of a sixth embodiment shown in FIG. 6, a through hole 51-2 is communicated with a circulating path 51-1 of fuel arranged in the circumferential wall portion of a main pipe rail 51. A connecting end portion 52-1 of a joint fitting 52 is mutually joined to the through hole 51-2 in a state in which the connecting end portion 52-1 is internally projected, fitted and inserted into the through hole 51-2. A connecting seal portion 52-2 arranged in an outward opening end portion of the joint fitting 52 is formed in a convex sectional shape having a flat face 52-2a perpendicular to the axis of a branching hole 52-3 of the joint fitting 52. In the diverging branch pipe 53 of a double pipe structure, a diameter enlarging portion 53-4 is formed at the terminal of this diverging branch pipe 53. A seat face 53-3 on the same face in an inner pipe 53-1 and an outer pipe 53-2 is arranged in a pipe end portion connected to this diameter enlarging portion 53-4. The diverging branch pipe 53 of the double pipe structure is irregularly fitted through a gasket 55 of a ring shape externally fitted to the convex connecting seal portion 52-2 of the above joint fitting 52. With respect to a pushing pressure seating face portion 56-1 of a washer 56 assembled between the diameter enlarging portion 53-4 of the diverging branch pipe 53 and a box nut 54 for fastening in advance, while pushing pressure with respect to a pressure receiving portion 53-5 of the diameter enlarging portion 53-4 is applied, the box nut 54 for fastening is screwed and fastened and attached to a male screw of the joint fitting 52 so that the joint structure is connected and constructed. Accordingly, equal effects are approximately obtained in the maintenance of air tightness with respect to the fuel of high pressure and high temperature, and rust preventing ability.

Similar to the diverging branch pipe in each of the above fourth and fifth embodiments, the diverging branch pipe 53 of the double pipe structure in this embodiment is also constructed by a double pipe formed by the inner pipe 53-1 and the outer pipe 53-2. The inner pipe 53-1 is constructed by a stainless steel pipe or a pipe body having a rust preventing film on the inner circumferential face. The opening end faces of the inner pipe 53-1 and the outer pipe 53-2 are formed so as to become the seat face 53-3. The diameter enlarging portion 53-4 is similarly formed by the inner pipe 53-1 and the outer pipe 53-2, and its outer circumferential face is set to the pressure receiving portion 53-5 with respect to the pushing pressure seating face portion 56-1 of the washer 56.

Embodiment 7

Figure 7:
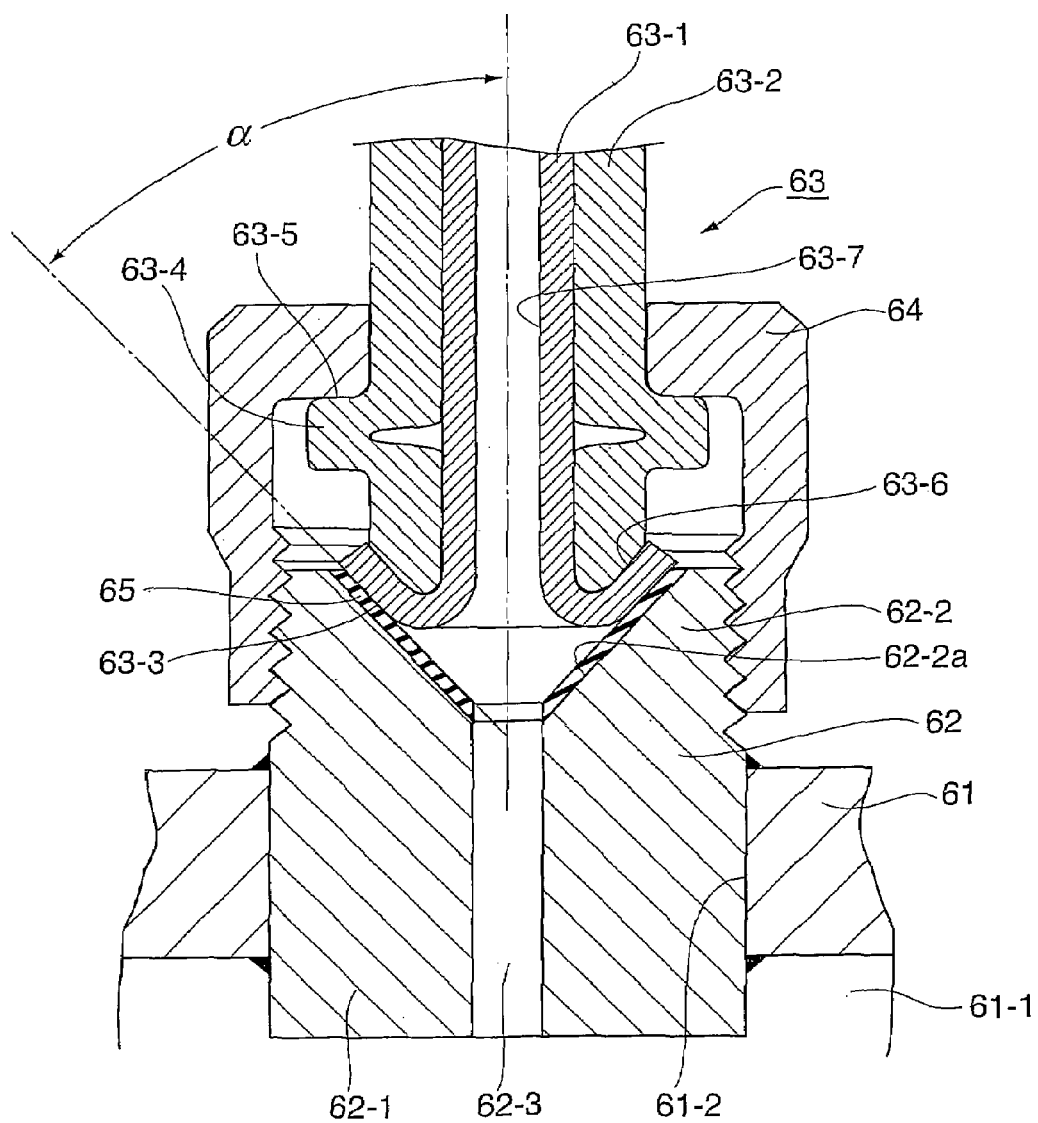
FIG. 7 is a schematic longitudinal sectional view of a main portion showing a seventh embodiment of the joint structure.

In the joint structure of a diverging branch pipe in the fuel rail for an internal combustion engine of a seventh embodiment shown in FIG. 7, a through hole 61-2 is communicated with a circulating path 61-1 of fuel arranged in the circumferential wall portion of a main pipe rail 61. A connecting end portion 62-1 of a joint fitting 62 is mutually joined to the through hole 61-2 in a state in which the connecting end portion 62-1 is internally projected, fitted and inserted into the through hole 61-2. A taper face 62-2a having a concave sectional shape having an inclination angle α of 58° with respect to the axis of a branching hole 62-3 is formed in a connecting seal portion 62-2 of the joint fitting 62. The diverging branch pipe 63 has a double pipe structure constructed by an inner pipe 63-1 and an outer pipe 63-2. A spool 63-4 is arranged at the terminal of the outer pipe 63-2 of the diverging branch pipe 63, and a pressure receiving portion 63-5 with respect to a box nut 64 for fastening is formed. A connecting head portion connected to the tip of the pressure receiving portion 63-5 is formed in a shape having a convex taper wall 63-6 having an inclination angle α of 58° with respect to the axis of the above branching hole 62-3 correspondingly to the concave taper face 62-2a having the inclination angle of 58° with respect to the axis of the branching hole 62-3 in the connecting seal portion 62-2 of the above joint fitting 62. A seat face 63-3 of a cone shape is formed by bending a pipe end portion of the inner pipe 63-1 outside so as to cover the connecting head portion of the outer pipe 63-2 having the convex taper wall 63-6. A conical gasket 65 approximately formed in a ring shape is preferably interposed between the seat face 63-3 and the above taper face 62-2a formed in the connecting seal portion 62-2 of the above joint fitting 62. A box nut 64 for fastening assembled into the diverging branch pipe 63 in advance is screwed to a male screw formed on the outer circumferential face of the joint fitting 62. The box nut 64 is then fastened and attached while pushing pressure with respect to the pressure receiving portion 63-5 formed by the spool 63-4 arranged at the terminal of the diverging branch pipe 63 is applied. Thus, the joint structure of the diverging branch pipe in the fuel rail for an internal combustion engine in this embodiment is connected and constructed.

The above diverging branch pipe 63 in this embodiment is constructed by a double pipe in which the inner pipe 63-1 is formed by a thin stainless steel pipe, and the outer pipe 63-2 is formed by a thick steel pipe of a normal iron system. The seat face 63-3 is formed by covering an opening end face of the outer pipe 63-2 with an opening end portion of the inner pipe 63-1. The pressure receiving portion of the inner pipe 63-1 including the seat face 63-3 is supported so as to be protected by the above outer pipe 63-2. While the diverging branch pipe is fastened and attached by giving rigidity to the pressure receiving portion through the gasket 65 of the ring shape between the pressure receiving portion and the taper face 62-2a formed in the seal portion 62-2 of the joint fitting 62, air tightness with respect to the fuel of high pressure and high temperature is firmly maintained by connection using the press attachment of the taper faces. Further, no exposure portion of an iron system material, etc. exists in a liquid contact portion 63-7 with the fuel. Thus, excellent rust preventing ability of the diverging branch pipe is obtained. In this embodiment, the stainless steel pipe is adopted in the inner pipe 63-1 itself. However, a normal iron system steel pipe is adopted in the inner pipe 63-1, and a rust preventing film of e.g., nickel plating, etc. can be also formed on the inner circumferential face of the inner pipe 63-1. The diverging branch pipe 63 of the double pipe structure may be also constructed so as to set the inner circumferential face of the inner pipe 63-1 to the seat face 63-3.

Embodiment 8

Figure 8:
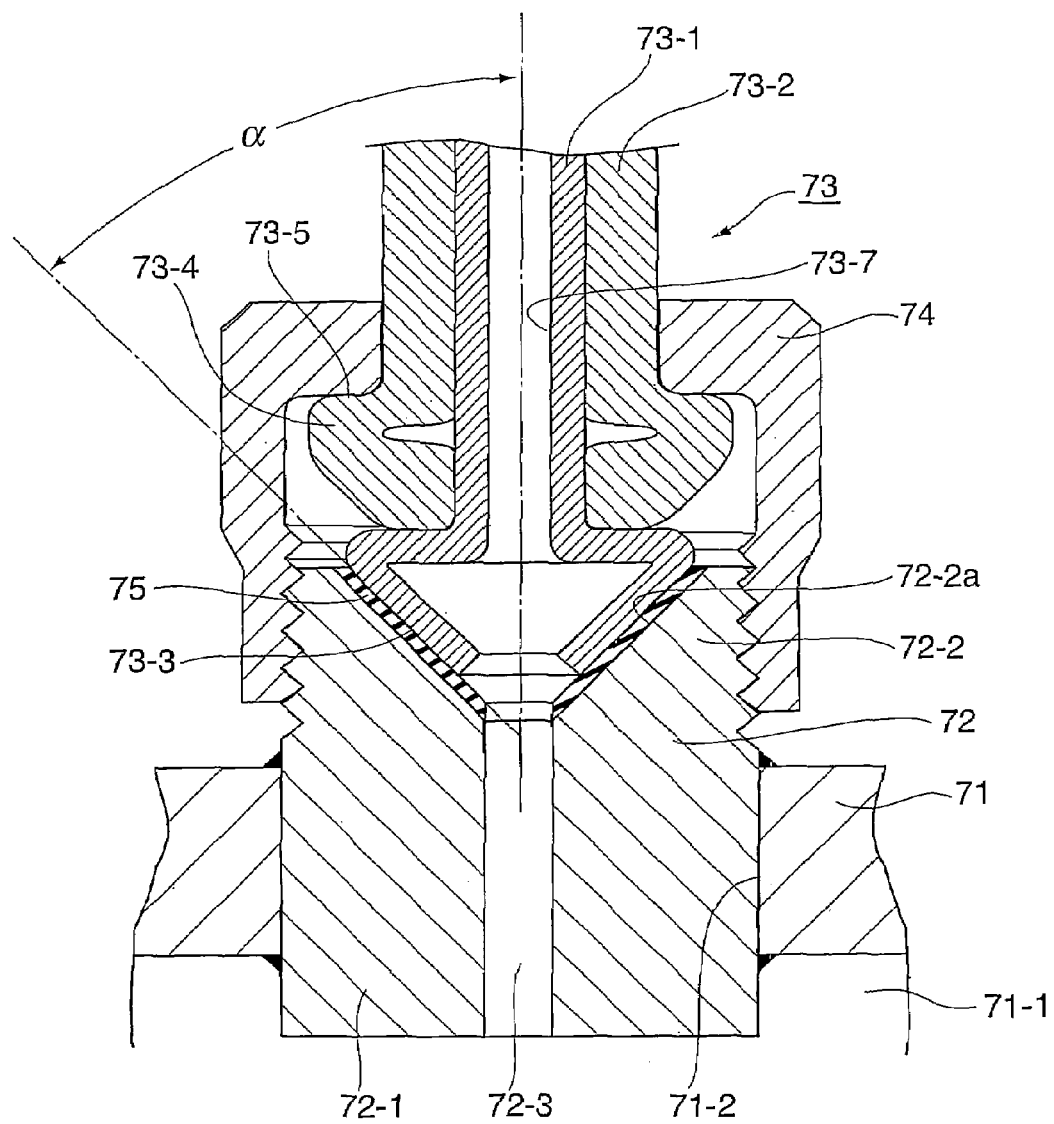
FIG. 8 is a schematic longitudinal sectional view of a main portion showing an eighth embodiment of the joint structure.

In the joint structure of a diverging branch pipe in the fuel rail for an internal combustion engine of an eighth embodiment shown in FIG. 8, a through hole 71-2 is communicated with a circulating path 71-1 of fuel arranged in the circumferential wall portion of a main pipe rail 71. A connecting end portion 72-1 of a joint fitting 72 is mutually joined to the through hole 71-2 in a state in which the connecting end portion 72-1 is internally projected, fitted and inserted into the through hole 71-2. A taper face 72-2a of a concave sectional shape having an inclination angle α of 58° with respect to the axis of a branching hole 72-3 is formed in a connecting seal portion 72-2 of the joint fitting 72. On the other hand, the diverging branch pipe 73 has a double pipe structure constructed by an inner pipe 73-1 and an outer pipe 73-2. The tip shape of a connecting head portion of the diverging branch pipe 73 formed by the outer pipe 73-2 is formed approximately perpendicularly to the axis of the diverging branch pipe 73. A pressure receiving portion 73-5 with respect to a box nut 74 for fastening is formed on the rear face of a spool 73-4 connected in the backward direction of the connecting head portion. A projecting portion of a pipe end of the inner pipe 73-1 is bent outside and covers the wall face of the above connecting head portion. Further, the projecting portion is bent inside and is turned up so that a taper wall of the double structure is formed. A seat face 73-3 having an inclination angle α of 58° with respect to the axis of the diverging branch pipe 73 is formed. A conical gasket 72 approximately formed in a ring shape is preferably interposed between the seat face 73-3 and the above taper face 72-2a formed in the connecting seal portion 72-2 of the above joint fitting 72. A box nut 74 for fastening assembled into the diverging branch pipe 73 in advance is screwed to a male screw formed on the outer circumferential face of the joint fitting 72. The box nut 74 is then fastened and attached while pushing pressure with respect to the pressure receiving portion 73-5 formed by the spool 73-4 arranged at the terminal of the diverging branch pipe 73 is applied. Thus, the joint structure of the diverging branch pipe in the fuel rail for an internal combustion engine in this embodiment is connected and constructed. In this case, air tightness with respect to the fuel of high pressure and high temperature is firmly maintained. Further, no exposure portion of an iron system material, etc. exists in a liquid contact portion 73-7 with the fuel, and excellent rust preventing ability of the joint structure is obtained.

Embodiment 9

Figure 9:
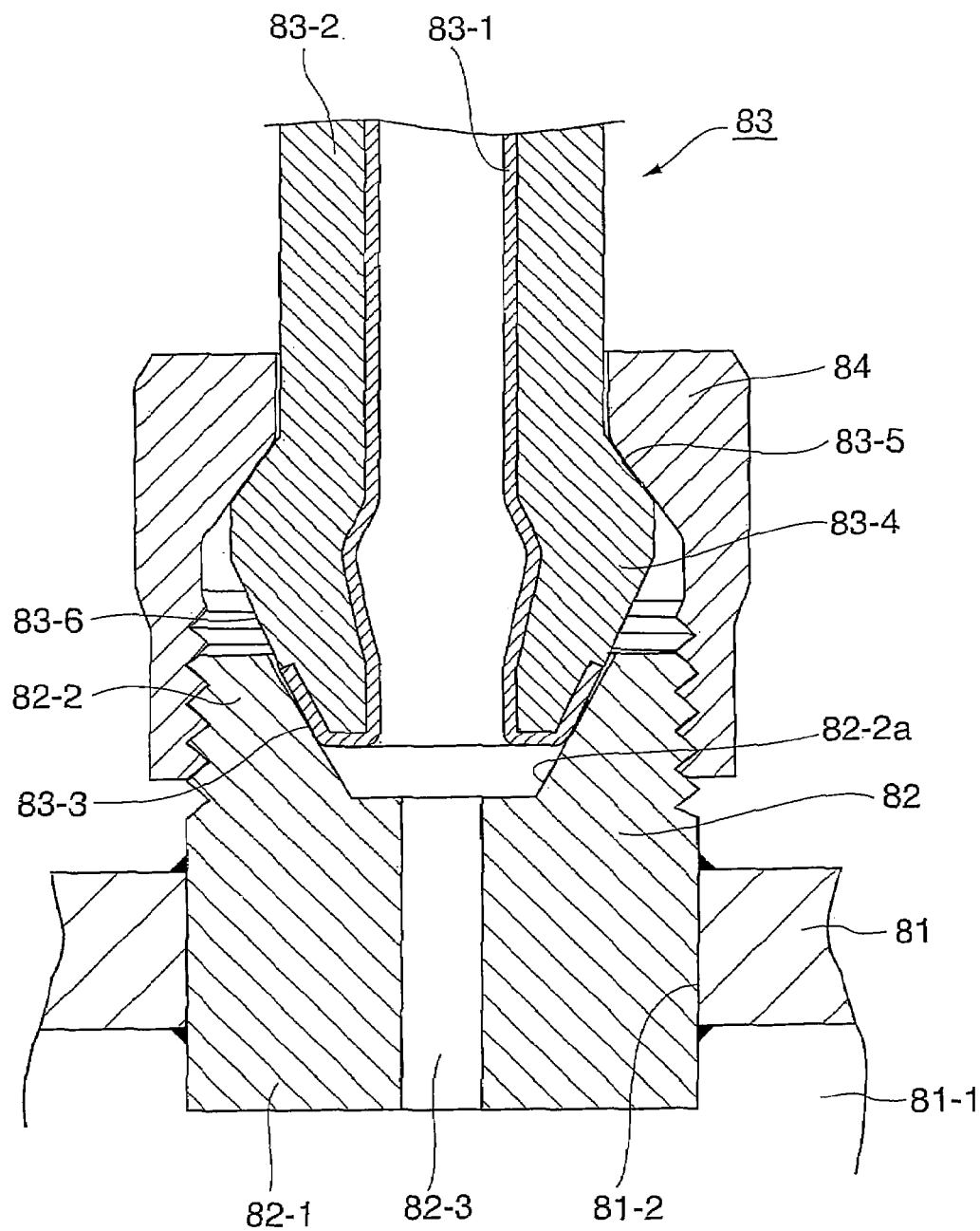
FIG. 9 is a schematic longitudinal sectional view of a main portion showing a ninth embodiment of the joint structure.
Figure 10:
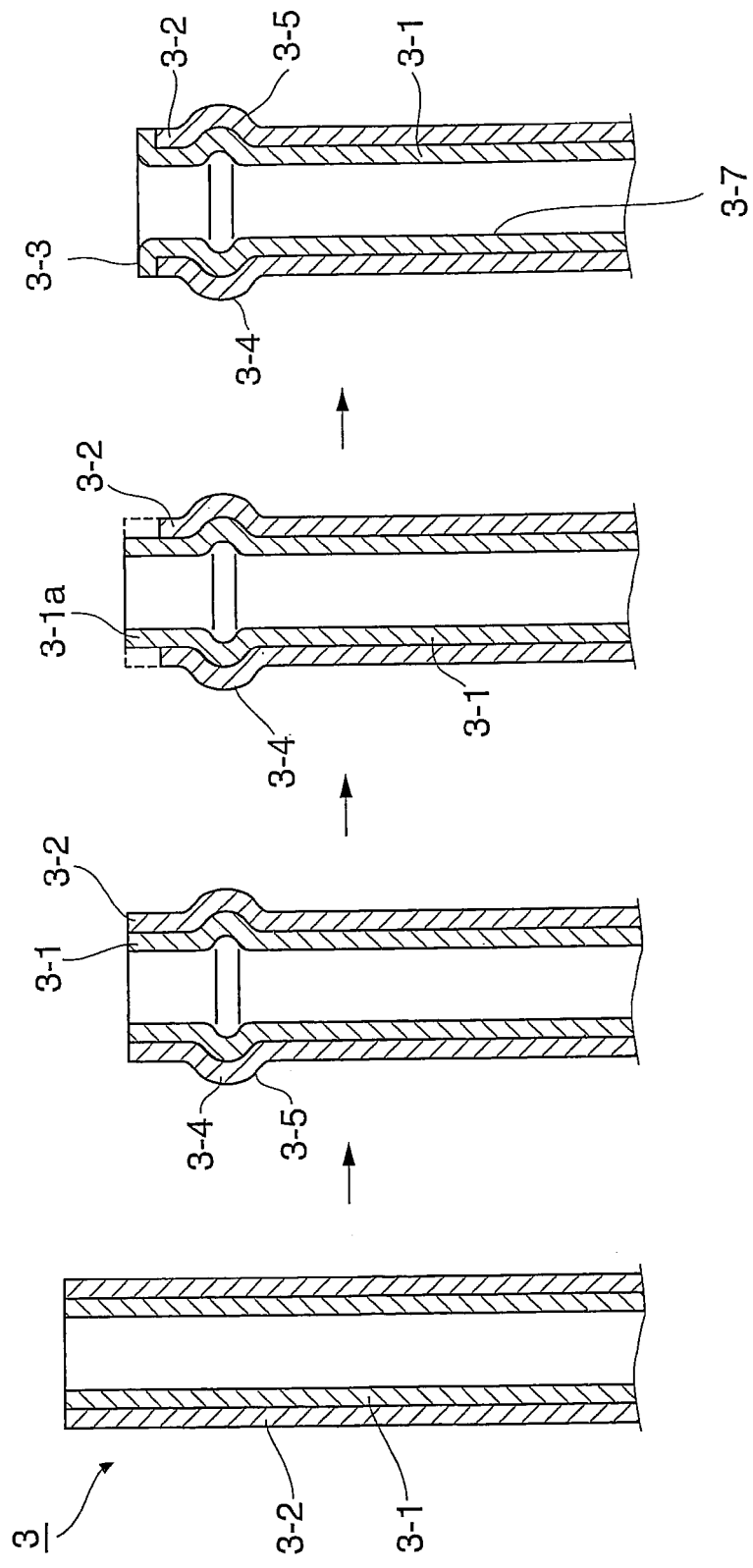
FIGS. 10(a) to 10(d) are process views schematically showing a first embodiment of a manufacture method of the diverging branch pipe in the fuel rail for an internal combustion engine of the present invention.
Figure 11:
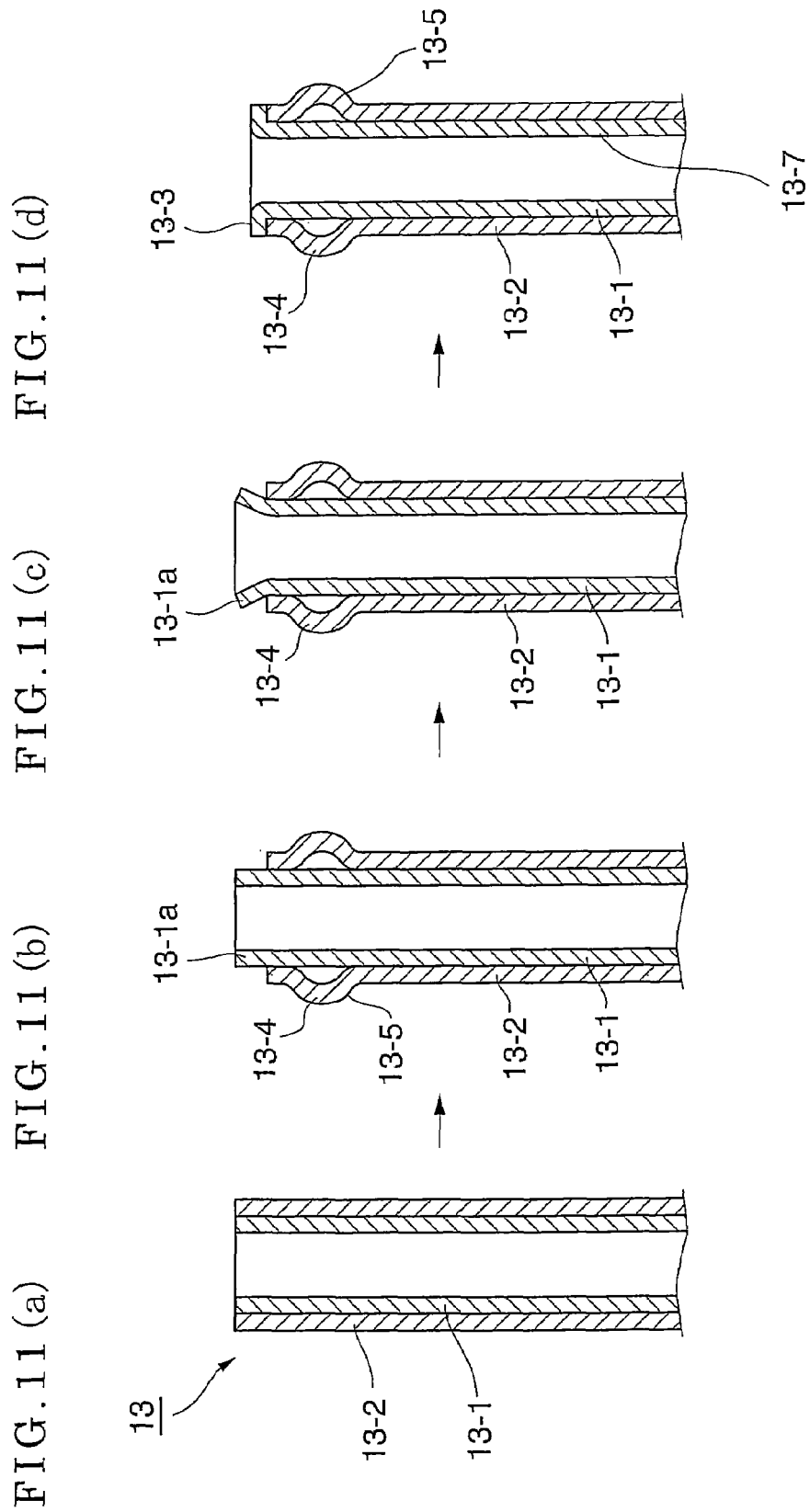
FIGS. 11(a) to 11(d) are process views schematically showing a second embodiment of the manufacture method of the diverging branch pipe.

In the joint structure of a diverging branch pipe in the fuel rail for an internal combustion engine of a ninth embodiment shown in FIG. 9, a through hole 81-2 is communicated with a circulating path 81-1 of fuel arranged in the circumferential wall portion of a main pipe rail 81. A connecting end portion 82-1 of a joint fitting 82 is mutually joined to the through hole 81-2 in a state in which the connecting end portion 82-1 is internally projected, fitted and inserted into the through hole 81-2. In a connecting seal portion 82-2 of the joint fitting 82, a portion of a branching hole 82-3 communicated with the circulating path 81-1 is set to a pressure receiving face 82-2a opened outwards. The diverging branch pipe 83 has a double pipe structure constructed by a thin inner pipe 83-1 manufactured by stainless steel and a thick outer pipe 83-2 formed by a steel pipe of a normal iron system. A pressure receiving portion 83-5 with respect to a box nut 84 for fastening, and a pressing face 83-6 corresponding to the connecting seal portion 82-2 of the above joint fitting 82 are formed by arranging a connecting head portion 83-4 of an abacus ball shape at the terminal of the outer pipe 83-2 of the diverging branch pipe 83. A seat face 83-3 is formed by bending a pipe end portion of the inner pipe 83-1 outside so as to cover the connecting head portion 83-4 of the outer pipe 83-2 having the above pressing face 83-6. In a state in which the seat face 83-3 is abutted and engaged with the pressure receiving face 82-2a on the above joint fitting 82 side, the box nut 84 for fastening assembled into the diverging branch pipe 83 in advance is screwed to a male screw formed on the outer circumferential face of the joint fitting 82. The box nut 84 is then fastened and attached while pushing pressure with respect to the pressure receiving portion 83-5 formed by the connecting head portion 83-4 arranged at the terminal of the diverging branch pipe 83 is applied. Thus, the joint structure of the diverging branch pipe in the fuel rail for an internal combustion engine in this embodiment is connected and constructed.

The above diverging branch pipe 83 in this embodiment is constructed by a double pipe in which the inner pipe 83-1 is formed by a thin stainless steel pipe, and the outer pipe 83-2 is formed by a thick steel pipe of a normal iron system. The seat face 83-3 is formed by covering an opening end face of the connecting head portion 83-4 of the outer pipe 83-2 with an opening end portion of the inner pipe 83-1. When the diverging branch pipe is fastened and attached to the joint fitting 82, air tightness with respect to the fuel of high pressure and high temperature is firmly maintained by connection using the press attachment of the seat faces. Further, no exposure portion of an iron system material, etc. exists in a liquid contact portion 83-7 with the fuel, and excellent rust preventing ability of the diverging branch pipe is obtained. A gasket can be interposed between the seat face 83-3 and the pressure receiving face 82-2a as in the first to eighth embodiments.

Manufacture methods of the diverging branch pipes 3, 13, 63, 73, 83 in the fuel rail for an internal combustion engine in the present invention adopted in each of the above embodiments will next be explained.

The manufacture method of the diverging branch pipe 3 adopted in the first embodiment of the above joint structure is first shown as a first embodiment in FIGS. 10(a) to 10(d). As shown in these figures, the terminal of a metallic pipe of the double structure constructed by an inner pipe 3-1 and an outer pipe 3-2 is simultaneously pushed-in by a punch in the pipe axis direction with respect to the inner pipe 3-1 and the outer pipe 3-2. Thus, a spool 3-4 formed by the inner pipe and the outer pipe is arranged. A pressure receiving portion 3-5 with respect to a box nut 4 for fastening is formed on the outer circumferential face of the spool 3-4. Next, a pipe end portion of the outer pipe 3-2 is cut and removed, and a pipe end portion of the inner pipe 3-1 is projected. While this projecting portion is enlarged in diameter outside, this projecting portion is bent and covers the pipe end portion of the outer pipe 3-2. Further, a seat face 3-3 is formed on the inner circumferential face of the inner pipe 3-1, and an entire liquid contact portion 3-7 is covered with the inner pipe 3-1 having excellent rust preventing ability. Further, the pressure receiving portion, etc. including the seat face 3-3 of the inner pipe 3-1 are supported so as to be protected by the above outer pipe 3-2. The diverging branch pipe 3 can be obtained by such a manufacture method.

In the diverging branch pipe 3 of this double structure, the inner pipe 3-1 is constructed by a metallic material having excellent rust preventing ability with respect to the outer pipe 3-2, or rust prevention processing is performed on the inner circumferential face of the inner pipe 3-1. This construction and the rust prevention processing are similar to those in the first embodiment of the above joint structure.

The manufacture method of the diverging branch pipe 13 adopted in the second embodiment of the above joint structure is shown as a second embodiment in FIGS. 11(a) to 11(d). As shown in these figures, only an outer pipe 13-2 is pushed-in by a punch in the pipe axis direction at the terminal of a metallic pipe of the double structure constructed by an inner pipe 13-1 and the outer pipe 13-2. Thus, a spool 13-4 formed by the outer pipe is arranged. A pressure receiving portion 13-5 with respect to a box nut 14 for fastening is formed on the outer circumferential face of the spool 13-4. Next, while a pipe end portion of the inner pipe 13-1 projected by forming the spool 13-4 using the outer pipe 13-2 is enlarged in diameter outside, this pipe end portion is bent and covers a pipe end portion of the outer pipe 13-2. Further, a seat face 13-3 is formed on the inner circumferential face of the inner pipe 13-1, and an entire liquid contact portion 13-7 is covered with the inner pipe 13-1 having excellent rust preventing ability. Further, the pressure receiving portion, etc. including the seat face 13-3 of the inner pipe 13-1 are supported so as to be protected by the above outer pipe 13-2. The diverging branch pipe 13 can be obtained by such a manufacture method.

In the diverging branch pipe 13 of this double structure, similar to the above description, the inner pipe 13-1 is also constructed by a metallic material having excellent rust preventing ability with respect to the outer pipe 13-2, or rust prevention processing is also performed on the inner circumferential face of the inner pipe 13-1.

Figure 12:
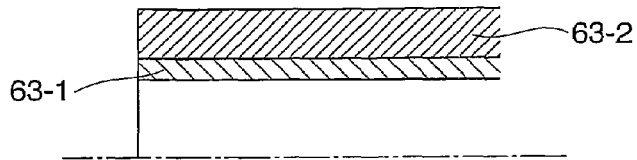
FIGS. 12(a) to 12(e) are semi-cutting process views schematically showing a third embodiment of the manufacture method of the diverging branch pipe.
Figure 12:
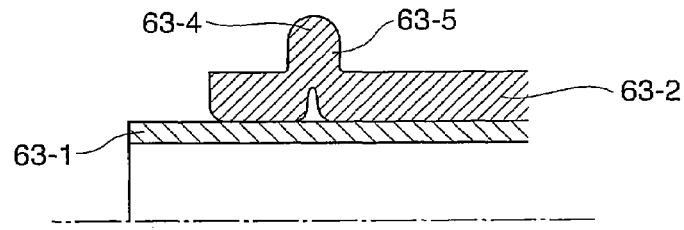
Figure 12:
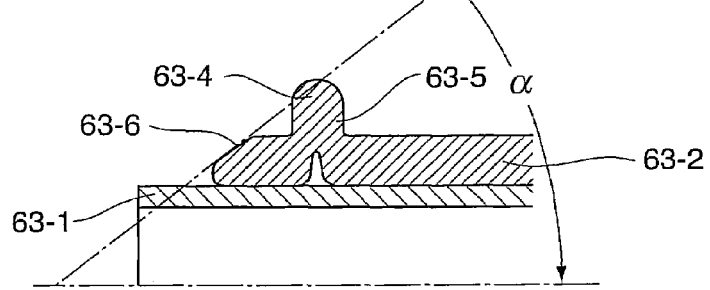
Figure 12:
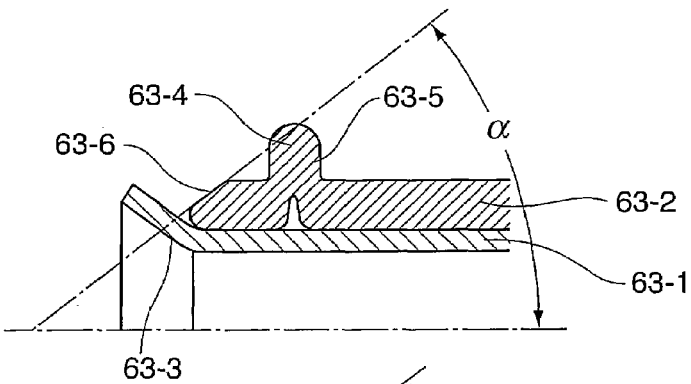
Figure 12:
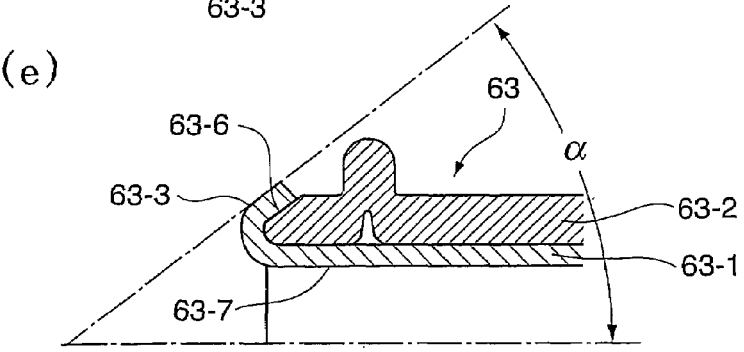

The manufacture method of the diverging branch pipe 63 adopted in the seventh embodiment of the above joint structure is shown as a third embodiment in FIGS. 12(*a*) to 12(*e*). As shown in these figures, only an outer pipe 63-2 is pushed-in by a punch in the pipe axis direction at the terminal of a metallic pipe of the double structure constructed by an inner pipe 63-1 and the outer pipe 63-2 (FIG. 12(*a*)). Thus, a spool 63-4 is arranged in this outer pipe (FIG. 12(*b*)). A pressure receiving portion 63-5 with respect to a box nut 64 for fastening is formed on the outer circumferential face of this spool 63-4. At this time, the pipe end of the above inner pipe 63-1 is projected with respect to the pipe end of the outer pipe 63-2. Next, when a pipe end portion of the outer pipe 63-2 is mechanically cut so as to have an inclination angle α of 58° with respect to the axis of the diverging branch pipe 63 and a taper wall 63-6 is formed (FIG. 12(*c*)), the above projected pipe end portion of the inner pipe 63-1 is bent while this pipe end portion is enlarged in diameter outside (FIG. 12(*d*)). The taper wall 63-6 formed in the pipe end portion of the outer pipe 63-2 is covered, and a seat face 63-3 having an inclination angle α of 58° with respect to the axis of the diverging branch pipe 63 is formed on the inner circumferential face of the inner pipe 63-1 (FIG. 12(*e*)). An entire liquid contact portion 63-7 is covered with the inner pipe 63-1 having excellent rust preventing ability. Further, the pressure receiving portion, etc. including the seat face 63-3 of the inner pipe 63-1 are supported so as to be protected by the above outer pipe 63-2. The diverging branch pipe 63 can be obtained by such a manufacture method.

In the diverging branch pipe 63 of this double structure, similar to the above description, the inner pipe 63-1 is also constructed by a metallic material having excellent rust preventing ability with respect to the outer pipe 63-2, or rust prevention processing is also performed on the inner circumferential face of the inner pipe.

The manufacture method of the diverging branch pipe 73 adopted in the eighth embodiment of the above joint structure is shown as a fourth embodiment in FIGS. 13(*a*) to 13(*c*). As shown in these figures, only an outer pipe 73-2 is pushed-in by a punch in the pipe axis direction at the terminal of a metallic pipe of the double structure constructed by an inner pipe 73-1 and the outer pipe 73-2 (FIG. 13(*a*)). Thus, a spool 73-4 is arranged in a connecting head portion of the terminal of the outer pipe 73-2 (FIG. 13(*b*)). A pressure receiving portion 73-5 with respect to a box nut 74 for fastening is formed behind the outer circumferential face of the spool 73-4. At this time, as shown in FIG. 13(*b*), the tip face of the above connecting head portion is formed on a wall face 73-6 approximately perpendicular to the axis of the diverging branch pipe 73, and the pipe end of the inner pipe 73-1 is projected with respect to the pipe end of the outer pipe 73-2. Next, while the above projected pipe end portion of the inner pipe 73-1 is enlarged in diameter outside so as to come in close contact with the perpendicular wall face 73-6 of the above outer pipe, this projected pipe end portion is bent and covers the connecting head portion of the outer pipe 73-2. Further, as shown in FIG. 13(*c*), the inner pipe 73-1 is bent inside, and a taper wall of a turning-up double structure is formed. A seat face 73-3 is formed by adjusting this taper wall so as to have an inclination angle α of 58° with respect to the axis of the diverging branch pipe 73. An entire liquid contact portion 73-7 is covered with the inner pipe 73-1 having excellent rust preventing ability.

Further, the pressure receiving portion, etc. including the seat face 73-3 of the inner pipe 73-1 are supported so as to be protected by the above outer pipe 73-2. The diverging branch pipe 73 can be obtained by such a manufacture method.

In the diverging branch pipe 73 of this double structure, similar to the above description, the inner pipe 73-1 is also constructed by a metallic material having excellent rust preventing ability with respect to the outer pipe 73-2, or rust prevention processing is also performed on the inner circumferential face of the inner pipe.

Figure 14:
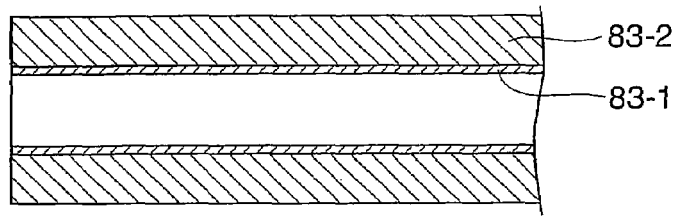
FIGS. 14(a) to 14(d) are process views schematically showing a fifth embodiment of the manufacture method of the diverging branch pipe.
Figure 14:
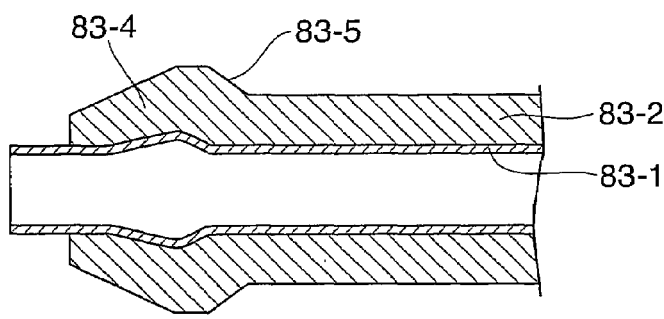
Figure 14:
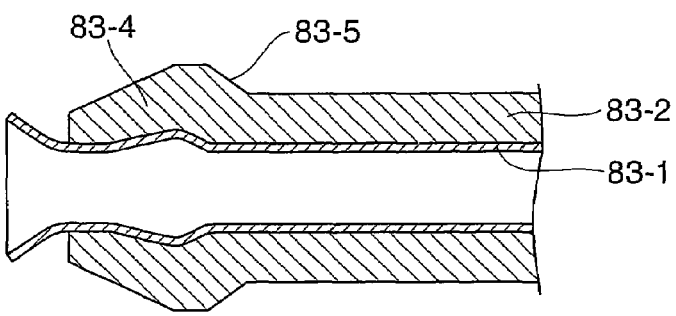
Figure 14:
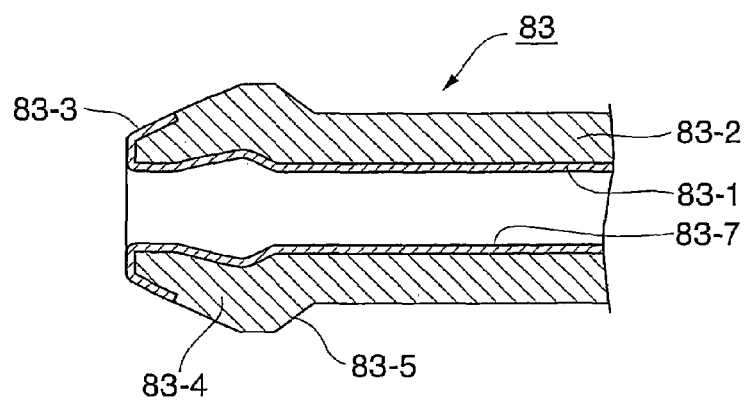

The manufacture method of the diverging branch pipe 83 adopted in the ninth embodiment of the above joint structure is shown as a fifth embodiment in FIGS. 14(*a*) to 14(*d*). As shown in these figures, the metallic pipe of a double structure is constructed by an inner pipe 83-1 and an outer pipe 83-2 manufactured by stainless steel (FIG. 14(*a*)). The terminal of this metallic pipe is pushed-in by a punch in the pipe axis direction such that the outer pipe 83-2 of this terminal is long and the inner pipe 83-1 of this terminal is short. Thus, a connecting head portion 83-4 of an abacus ball shape is arranged at the terminal of the outer pipe 83-2 (FIG. 14(*b*)). The inner pipe 83-1 comes in close contact with the inner face of the outer pipe 83-2, and a pressure receiving portion 83-5 with respect to a box nut 84 for fastening is formed in a neck lower portion of this connecting head portion 83-4. The pipe end of the inner pipe 83-1 is projected with respect to the pipe end of the outer pipe 83-2 by this forming (FIG. 14(*b*)). Next, the above projected pipe end portion of the inner pipe 83-1 is enlarged in diameter in a trumpet shape (FIG. 14(*c*)). Further, while the projected pipe end portion of the inner pipe 83-1 is enlarged in diameter outside so as to come in close contact with the outer wall face of the connecting head portion 83-4 of the abacus ball shape of the above outer pipe, this projected pipe end portion is bent (FIG. 14(*d*)) and covers the connecting head portion 83-4 of the outer pipe 83-2. Further, its outside bent portion is strongly pressed against the outer wall face of the connecting head portion 83-4, and is buried in the connecting head portion so as to be located on the same face as this wall face, and a seat face 83-3 is formed. Thus, an entire liquid contact portion 83-7 is covered with the inner pipe 83-1 having excellent rust preventing ability. Further, the seat face of the connecting head portion 83-4 is formed by the inner pipe 83-1. The diverging branch pipe 83 can be obtained by such a manufacture method.

When the end portion of the inner pipe 83-1 is bent in the connecting head portion 83-4 of the abacus ball shape of the outer pipe 83-2, the bending forming may be also performed by inserting an unillustrated cored bar into the inner pipe 83-1. This cored bar may be integrated with an unillustrated punch, or may be also separated from this punch.

Figure 15:
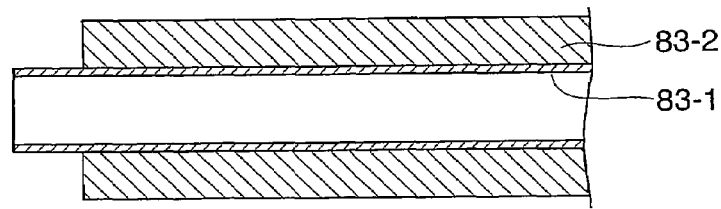
FIGS. 15(a) and 15(b) are cross-sectional views showing another pipe end portion of a double metallic pipe before forming in the fifth embodiment of FIG. 14.
Figure 15:
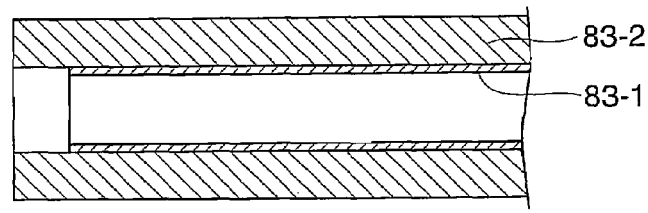

In the pipe end portion of the double metallic pipe before the forming in the manufacture method of the diverging branch pipe 83 shown in the above FIG. 14, the head portion forming may be also executed by projecting the inner pipe 83-1 from the outer pipe 83-2 in advance by a suitable length as shown in FIG. 15(*a*), or projecting the outer pipe 83-2 from the inner pipe 83-1 in advance by a suitable length as shown in FIG. 15(*b*).

Figure 16:
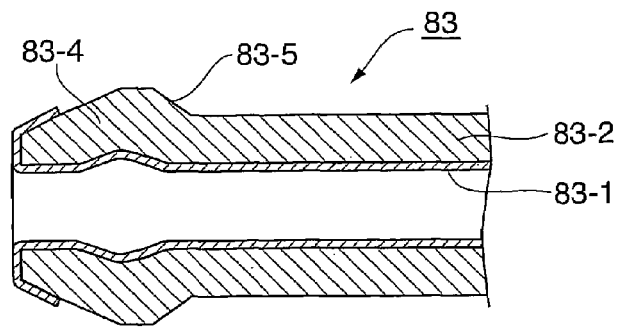
FIG. 16 is a cross-sectional view of a main portion showing a modified example of the diverging branch pipe manufactured by the fifth embodiment of FIG. 14.

Further, as shown in FIG. 16, it is not necessary that a turning-up portion of the inner pipe covering the outer wall face of the connecting head portion 83-4 of the diverging branch pipe 83 manufactured by the manufacture method shown in the above FIG. 14 is always buried into the connecting head portion and is always set to the same face as the outer wall face. A step difference may also exist between the turning-up portion and this outer wall face. In the case of a type in which a pocket portion (gap) exists inside the connecting head portion, the inner pipe is not necessarily closely attached along the inner face of this pocket, but an annular small gap may also exist between the outer circumferential face of the inner pipe and the pocket portion.

In the joint structure of the present invention shown in each of the above embodiments, the liquid contact portion of each of the main pipe rails 1, 11, 21, 31, 41, 51, 61, 71, 81 and each of the diverging branch pipes 3, 13, 23, 33, 43, 53, 63, 73, 83 is formed by a film of plural layers or a diffused single layer of stainless steel, or a Ni plating film and a Ni base alloy plating film having a corrosion resisting property with respect to the fuel. Therefore, there is no generation of rust, etc. in the main pipe rail and the diverging branch pipe. Further, no deterioration of the fuel is also caused since no film of copper exists on the inner circumferential face. Further, when the connecting construction is set by interposing the gaskets 5, 15, 25, 35, 45, 55, 65, 75 between each of the joint fittings 2, 12, 22, 32, 42, 52, 62, 72 and each of the diverging branch pipes 3, 13, 23, 33, 43, 53, 63, 73, the seat face is formed through the gasket. Therefore, a more excellent airtight property is secured and it is possible to more reliably seal the fuel of a high pressure from 15 to 200 MPa as well as low pressure.

Further, the diverging branch pipe of the present invention in each of the above embodiments is basically constructed by the double pipe formed by the inner pipe having excellent rust preventing ability with respect to the fuel, and the outer pipe externally fitted so as to protect this inner pipe. The entire liquid contact portion with respect to the fuel is covered with the inner pipe, and the pressure receiving portion, etc. including the seat face of this inner pipe are structurally supported so as to be protected by the outer pipe. Accordingly, the inner pipe constructed by a corrosion resisting material coming in direct contact with the fuel having a strong corrosive property at high pressure is supported by the outer pipe constructed by a steel material of high rigidity, and strong fastening attachment with respect to the seal face, etc. can be performed. Further, the seal face of the diverging branch pipe and the joint fitting is set to a taper wall having the same inclination angle with respect to the branching hole. Thus, the branching hole is easily aligned and a shift of the seat face can be prevented in advance. The sealing is more firmly performed in cooperation with the action of the gasket. The above inclination angle $\alpha$ formed in the joint fitting and the diverging branch pipe is arbitrary in a range from 50° to 120° with respect to the axis of the branching hole. However, for example, the inclination angle $\alpha$ is preferably about 60° as an angle of the connecting head portion of an injection pipe for connecting an injector and a pump in a diesel engine for an automobile.

The manufacture method of the diverging branch pipe of the present invention is provided as shown in each of the above embodiments. However, the cutting processing, the pressing processing using the punch, the joining means of each member, etc. are also arbitrary. Any other means can be used if these means are constructed along the gist of the present invention. Further, the rust preventing film using the nickel plating or the nickel base alloy plating is illustrated as the rust prevention processing of the inner pipe of the diverging branch pipe in each of the above embodiments. However, two layers can be also set by forming a nickel base alloy plating film of a Ni—P alloy, etc. after primary rust prevention processing using the nickel film. Further, a single layer can be also set by heating this film and diffusing or melting this film.

In the above embodiments, one example of only the manufacture method of the diverging branch pipe in each of embodiments 1, 2, and 7 to 9 is disclosed. However, the other diverging branch pipes can be also manufactured approximately by a similar simple process. Therefore, the diverging branch pipe having an excellent corrosion resisting property with respect to fuel, and able to prevent deterioration of the fuel in advance can be manufactured at low cost by a comparatively small number of processes.

INDUSTRIAL APPLICABILITY

The joint structure of the diverging branch pipe in the fuel rail for an internal combustion engine of a spark ignition or compression ignition system of the present invention sufficient resists the use of lower gasoline, sour gasoline, DME, alcohol, alcohol composite fuel, light oil, hydrogen, etc. Further, no deterioration of gasoline is caused. Moreover, the joint structure can be reliably sealed even in the fuel of a high pressure of 15 to 200 MPa as well as low pressure. Further, the joint structure of the diverging branch pipe in the fuel rail for an internal combustion engine in the present invention can be utilized in a wide use as in piping joints of other high pressure fuels except for gasoline, a high pressure fluid, high pressure gas, etc.

What is claimed is:

1. A joint structure of a diverging branch pipe in a fuel rail for an internal combustion engine in which the fuel rail for an internal combustion engine manufactured by stainless steel or manufactured by steel performed with respect to rust prevention processing on at least the inner face, and the diverging branch pipe constructed by a double pipe formed by an outer pipe and an inner pipe having excellent rust preventing ability with respect to fuel on its inner circumferential face in comparison with the outer circumferential face of the outer pipe are connected by a nut for fastening through a joint fitting; wherein a connecting seal portion of said diverging branch pipe and the joint fitting has rust preventing ability equal to that of the inner circumferential face of the diverging branch pipe; an entire liquid contact portion including a seal face of the diverging branch pipe with respect to the fuel is covered with said inner pipe; and a pressure receiving portion of the inner pipe including the seal face is constructed so as to be supported by said outer pipe.

2. The joint structure of the diverging branch pipe in the fuel rail for an internal combustion engine according to claim 1, wherein a gasket is interposed between the connecting seal portion of said joint fitting and a seat face of the diverging branch pipe, and the connecting construction is set by said nut for fastening assembled into this diverging branch pipe in advance.

3. The joint structure of the diverging branch pipe in the fuel rail for an internal combustion engine according to claim 1, wherein a spool or a projection is arranged at the terminal of said diverging branch pipe, and is set to the pressure receiving portion of the nut for fastening.

4. The joint structure of the diverging branch pipe in the fuel rail for an internal combustion engine according to claim 2, wherein a spool or a projection is arranged at the terminal of said diverging branch pipe, and is set to the pressure receiving portion of the nut for fastening.

5. A joint structure of a diverging branch pipe in a fuel rail for an internal combustion engine manufactured by stainless steel or manufactured by steel performed with respect to rust prevention processing on at least the inner face, and the diverging branch pipe constructed by a double pipe formed by an outer pipe and an inner pipe having excellent rust preventing ability with respect to fuel on its inner circumferential face in comparison with the outer circumferential face of the outer pipe are connected by a nut for fastening through a joint fitting; wherein a connecting seal portion of said diverging branch pipe and the joint fitting has rust preventing ability equal to that of the inner circumferential face of the diverging branch pipe; an entire liquid contact portion including a seal face of the diverging branch pipe with respect to the fuel is covered with said inner pipe; and a pressure receiving portion of the inner pipe including the seal face is constructed so as to be supported by said outer pipe, wherein the connection seal portion of said joint fitting is formed in a concave sectional shape having a flat face perpendicular to the axis of a branching hole of the joint fitting, and an opening end face of said outer pipe is bent so as to be covered with an opening end portion of said inner pipe, and the diverging branch pipe formed so as to set the inner circumferential face of the inner pipe to a seat face is connected by the nut for fastening assembled into this diverging branch pipe in advance.

6. The joint structure of the diverging branch pipe in the fuel rail for an internal combustion engine according to claim 5, wherein a gasket is interposed between the connecting seal portion of said joint fitting and a seat face of the diverging branch pipe, and the connecting construction is set by said nut for fastening assembled into this diverging branch pipe in advance.

7. The joint structure of the diverging branch pipe in the fuel rail for an internal combustion engine according to claim 5, wherein a spool or a projection is arranged at the terminal of said diverging branch pipe, and is set to the pressure receiving portion of the nut for fastening.

8. A joint structure of the diverging branch pipe in the fuel rail for an internal combustion engine in which the fuel rail for an internal combustion engine manufactured by stainless steel or manufactured by steel performed with respect to rust prevention processing on at least the inner face, and the diverging branch pipe constructed by a double pipe formed by an outer pipe and an inner pipe having excellent rust preventing ability with respect to fuel on its inner circumferential face in comparison with the outer circumferential face of the outer pipe are connected by a nut for fastening through a joint fitting; wherein a connecting seal portion of said diverging branch pipe and the joint fitting has rust preventing ability equal to that of the inner circumferential face of the diverging branch pipe; an entire liquid contact portion including a seal face of the diverging branch pipe with respect to the fuel is covered with said inner pipe; and a pressure receiving portion of the inner pipe including the seal face is constructed so as to be supported by said outer pipe, wherein the connecting seal portion of said joint fitting is formed in a conical convex shape, and a seat face of said diverging branch pipe is formed in a single flare shape, and a conical gasket of a ring shape is interposed between the connecting seal portion of the conical convex shape and the seat face of the single flare shape, and the connecting construction is performed by the nut for fastening assembled into the diverging branch pipe in advance.

9. A joint structure of the diverging branch pipe in the fuel rail for an internal combustion engine in which the fuel rail for an internal combustion engine manufactured by stainless steel or manufactured by steel performed with respect to rust prevention processing on at least the inner face, and the diverging branch pipe constructed by a double pipe formed by an outer pipe and an inner pipe having excellent rust preventing ability with respect to fuel on its inner circumferential face in comparison with the outer circumferential face of the outer pipe are connected by a nut for fastening through a joint fitting; wherein a connecting seal portion of said diverging branch pipe and the joint fitting has rust preventing ability equal to that of the inner circumferential face of the diverging branch pipe; an entire liquid contact portion including a seal face of the diverging branch pipe with respect to the fuel is covered with said inner pipe; and a pressure receiving portion of the inner pipe including the seal face is constructed so as to be supported by said outer pipe, wherein the connecting seal portion of said joint fitting is formed in a conical concave shape, and a seat face of said diverging branch pipe is formed in a single flare shape, and a conical gasket of an abacus ball shape is interposed between the connecting seal portion of said conical concave shape and the seat face of said single flare shape, and the connecting construction is performed by the nut for fastening assembled into the diverging branch pipe in advance.

10. A joint structure of the diverging branch pipe in the fuel rail for an internal combustion engine in which the fuel rail for an internal combustion engine manufactured by stainless steel or manufactured by steel performed with respect to rust prevention processing on at least the inner face, and the diverging branch pipe constructed by a double pipe formed by an outer pipe and an inner pipe having excellent rust preventing ability with respect to fuel on its inner circumferential face in comparison with the outer circumferential face of the outer pipe are connected by a nut for fastening through a joint filling; wherein a connecting seal portion of said diverging branch pipe and the joint filling has rust preventing ability equal to that of the inner circumferential face of the diverging branch pipe; an entire liquid contact portion including a seal face of the diverging branch pipe with respect to the fuel is covered with said inner pipe; and a pressure receiving portion of the inner pipe including the seal face is constructed so as to be supported by said outer pipe, wherein a taper face of a concave shape having an inclination angle $\alpha$ with respect to the axis of a branching hole is formed in the connecting seal portion of said joint filling; a connecting head portion of the outer pipe of said diverging branch pipe is formed in a shape having a taper wall of a convex shape having an inclination angle $\alpha \pm 5°$ correspondingly to the taper face of the concave shape having the inclination angle c in the connecting seal portion of said joint filling; a seat face of a ring shape is formed by bending the tip of the inner pipe outside so as to cover the connecting head portion of the outer pipe having the taper wall of the convex shape; a conical gasket approximately formed in a ring shape is interposed between this seat face and the taper face of said joint fitting; and the connecting construction is performed by the nut for fastening assembled into said diverging branch pipe in advance.

11. The joint structure of the diverging branch pipe in the fuel rail for an internal combustion engine according to claim 10, wherein said inclination angle $\alpha$ is set to 50° to 120° with respect to the axis of the branching hole of the joint fitting.

12. The joint structure of the diverging branch pipe in the fuel rail for an internal combustion engine according to claim 10, wherein the tip shape of the connecting head portion of said diverging branch pipe is formed approximately perpendicularly to the axis of the diverging branch pipe, and the seat face of the inner pipe covering the connecting head portion is formed on the taper wall face of a turning-up double structure.

13. A joint structure of a diverging branch pipe in a fuel rail for an internal combustion engine in which the fuel rail for an internal combustion engine manufactured by stainless steel or manufactured by steel performed with respect to rust prevention processing on at least the inner face, and the diverging branch pipe constructed by a double pipe formed by an outer pipe and an inner pipe having excellent rust preventing ability with respect to fuel on its inner circumferential face in comparison with the outer circumferential face of the outer pipe are connected by a nut for fastening through a joint fitting; wherein a connecting seal portion of said joint fitting is set to a flat face; a diameter enlarging portion is arranged in a terminal portion of said diverging branch pipe and a pressure receiving portion is formed on the outer circumferential face of this diameter enlarging portion; a gasket is interposed between a seat face formed on an end face of a connecting head portion connected to this pressure receiving portion and the flat face of said joint fitting; a pressing seating face portion formed in a washer assembled onto the diverging branch pipe side in advance is abutted and engaged with the pressure receiving portion formed on the outer circumferential face of the diameter enlarging portion of said diverging branch pipe; an entire liquid contact portion of the inner circumferential face of the diverging branch pipe with respect to the fuel and the seat face is covered with said inner pipe; and the connecting construction is performed by the nut for fastening.

14. A joint structure of a diverging branch pipe in a fuel rail for an internal combustion engine in which the fuel rail for an internal combustion engine is manufactured by stainless steel or is manufactured by steel performed with respect to rust prevention processing on at least the inner face; the diverging branch pipe has a connecting head portion of a cutting head conical shape, an arc shape or an abacus ball shape constituting a pressing face to a partner seating portion in a connecting end portion; the diverging branch pipe is formed by internally mounting a thin inner pipe manufactured by stainless steel in a close fitting shape over the entire circumferential face length of a circulating hole of the axial interior; and the fuel rail for an internal combustion engine and the diverging branch pipe are connected by a nut for fastening through a joint fitting; wherein a seat face is formed by outside bending the tip portion of said inner pipe manufactured by stainless steel so as to cover the tip portion of said connecting head portion; and the seat face and a pressure receiving face of said joint fitting are abutted and engaged; an entire liquid contact portion of the inner circumferential face and the seat face of the diverging branch pipe with respect to the fuel is covered with said inner pipe; and a connecting construction is performed by the nut for fastening.

15. The joint structure of the diverging branch pipe in the fuel rail for an internal combustion engine according to claim 14, wherein the outside bent portion of the inner pipe manufactured by stainless steel and covering the tip portion of said connecting head portion is buried into the connecting head portion so as to be located on the same face as the tip portion of the connecting head portion so that the seat face is formed.

16. A diverging branch pipe in a fuel rail for an internal combustion engine in which the diverging branch pipe in a joint structure of the fuel rail for an internal combustion engine is constructed by a double pipe formed by an outer pipe and an inner pipe; the inner pipe is constructed by a stainless steel pipe or a pipe body having a rust preventing film on the inner circumferential face; the diverging branch pipe is set to a structure for covering an opening end face of the outer pipe with an opening end portion of the inner pipe so as to set the inner circumferential face of the inner pipe to a seat face; an entire liquid contact portion including a seal face with respect to the fuel is covered with said inner pipe; a pressure receiving portion of the inner pipe is supported by said outer pipe; and a spool or a projection as the pressure receiving portion of a nut for fastening is arranged in a terminal portion.

17. The diverging branch pipe in the fuel rail for an internal combustion engine according to claim 16, wherein the rust preventing film of said inner pipe is constructed by a film of plural layers or a diffused single layer of a Ni plating film, a Ni base alloy film, or the Ni plating film and a Ni—P alloy plating film.

* * * * *